US012379582B2

(12) United States Patent
Amthor et al.

(10) Patent No.: US 12,379,582 B2
(45) Date of Patent: Aug. 5, 2025

(54) MICROSCOPY SYSTEM AND ASSOCIATED METHODS

(71) Applicant: Carl Zeiss Microscopy GmbH, Jena (DE)

(72) Inventors: Manuel Amthor, Jena (DE); Daniel Haase, Zoellnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 18/888,670

(22) Filed: Sep. 18, 2024

(65) Prior Publication Data

US 2025/0102788 A1  Mar. 27, 2025

(30) Foreign Application Priority Data

Sep. 22, 2023 (DE) ...................... 10 2023 125 820.6

(51) Int. Cl.
  *G02B 21/36* (2006.01)
  *G02B 21/00* (2006.01)
  *G06V 10/80* (2022.01)
  *G06V 10/82* (2022.01)

(52) U.S. Cl.
  CPC ......... *G02B 21/365* (2013.01); *G02B 21/008* (2013.01); *G06V 10/80* (2022.01); *G06V 10/82* (2022.01)

(58) Field of Classification Search
  CPC .... G02B 21/365; G02B 21/008; G06V 10/80; G06V 10/82
  See application file for complete search history.

(56) References Cited

U.S. PATENT DOCUMENTS

| 6,669,484 B1 * | 12/2003 | Lund ...................... G09B 23/38 434/307 R |
| 11,054,626 B2 | 7/2021 | Kleppe et al. |
| 12,010,076 B1 * | 6/2024 | Andrew ................ H04L 51/046 |
| 2018/0348500 A1 | 12/2018 | Naaman, III et al. |
| 2020/0371333 A1 | 11/2020 | Amthor et al. |
| 2022/0076393 A1 * | 3/2022 | Chen ......................... G06T 5/20 |

(Continued)

FOREIGN PATENT DOCUMENTS

| CN | 108139580 A | 6/2018 |
| CN | 112149606 A | 12/2020 |

(Continued)

OTHER PUBLICATIONS

Li et al. "Visualbert: A simple and performant baseline for vision and language." arXiv preprint arXiv: 1908.03557. (Year: 2019).*

(Continued)

*Primary Examiner* — Ross Varndell
(74) *Attorney, Agent, or Firm* — LaBatt, LLC

(57) ABSTRACT

In a computer-implemented method for controlling a microscope, a textual input describing a desired microscope image and an employed sample is received. The textual input and an overview image of the employed sample are input into a large language model, which is trained to process the textual input and the overview image together to calculate microscope settings for capturing a microscope image that corresponds to the desired microscope image. A microscope image is then captured with these calculated microscope settings.

20 Claims, 9 Drawing Sheets

(56) References Cited

U.S. PATENT DOCUMENTS

| | | | |
|---|---|---|---|
| 2022/0114725 A1 | 4/2022 | Amthor et al. | |
| 2022/0157306 A1* | 5/2022 | Albrecht | G06F 3/167 |
| 2022/0229862 A1* | 7/2022 | Kappel | G06N 3/08 |
| 2022/0245188 A1* | 8/2022 | Kappel | G06F 16/53 |
| 2022/0254177 A1* | 8/2022 | Kappel | G06F 18/285 |
| 2023/0058876 A1* | 2/2023 | Zhang | G06T 7/0014 |
| 2023/0102428 A1 | 3/2023 | Oktay et al. | |
| 2023/0395239 A1* | 12/2023 | Ince | G16H 30/20 |
| 2024/0070537 A1 | 2/2024 | Amthor et al. | |
| 2024/0273877 A1* | 8/2024 | Guerreiro-Lucas | G06V 20/69 |
| 2024/0274250 A1* | 8/2024 | Breitenstein | G06F 3/16 |

FOREIGN PATENT DOCUMENTS

| | | |
|---|---|---|
| DE | 102019114012 A | 11/2020 |
| DE | 102020108796 A | 9/2021 |
| JP | 2022124900 A | 8/2022 |

OTHER PUBLICATIONS

Yu et al., "Multimodal transformer with multi-view visual representation for image captioning." arXiv preprint arXiv: 1905.07841, 2019a. (Year: 2019).*

Devlin, et al., "BERT: Pre-training of Deep Bidirectional Transformers for Language Understanding," May 24, 2019, 16 pages.

Dosovitsky, et al., "An Image is Worth 16x16 Words: Transformers for Image Recognition at Scale," Jun. 3, 2021, 22 pages.

OpenAI (2023), "GPT-4 Technical Report," 98 pages.

Hochreiter, et al., "Long Short-term Memory," Neural Computation, 1997, 33 pages.

Holburn, et al., "Voice Control of the Scanning Electron Microscope Using a Low-Cost Virtual Assistant," Microscopy Society of America, 2021, pp. 2756-2757.

Lambert, et al. "Illustrating Reinforcement Learning from Human Feedback (RLHF)," https://huggingface.co/blog/rlhf, Dec. 9, 2022, 14 pages.

Liu, et al., "A ConvNet for the 2020s," Facebook AI Research (FAIR) and UC Berkley, Mar. 2, 2022, 15 pages.

McDermott, et al., "Controlling and scripting laboratory hardware with open-source, intuitive interfaces: OpenFlexure Voice Control and OpenFlexure Blockly," 18 pages.

Radford, et al., "Improving Language Understanding by Generative Pre-Training," 12 pages.

Vaswani, et al., "Attention is All You Need," Dec. 6, 2017, 15 pages.

Wu, et al., "CvT: Introducing Convolutions to Vision Transformers," Mar. 29, 2021, 10 pages.

"Zeiss AI Sample finder: Automated sample identification for efficient imaging," 8 pages.

"Zen Microscopy Software," 22 pages.

Brown et al., OpenAI, "Language Models are Few-Shot Learners," Jul. 22, 2020, 75 pages.

Karras et al., Elucidating the Design Space of Diffusion-Based Generative Models, 36th Conference on Neural Information Processing Systems, Oct. 11, 2022, 47 pages.

Search Report for German Application No. 10 2023 125 820.6, Jun. 7, 2024, 7 pages (English translation not available).

Decision to Grant for German Application No. 10 2023 125 820.6 with English translation, Jul. 16, 2024, 18 pages.

Search Report for German Application No. 10 2023 125 820.6, Jun. 7, 2024 with English translation, 13 pages.

Decision to Grant for German Application No. 10 2023 125 820.6 with English translation, Jul. 16, 2024, 18 pages (improved quality).

Office action for Chinese Application No. 202411299994.1 with English translation, Jun. 14, 2025, 23 pages. (attached to end of original copy).

* cited by examiner

MICROSCOPY SYSTEM AND ASSOCIATED METHODS

REFERENCE TO RELATED APPLICATIONS

The current application claims the benefit of German Patent Application No. 10 2023 125 820.6, filed on Sep. 22, 2023, which is hereby incorporated by reference.

TECHNICAL FIELD

The present disclosure relates to a microscopy system and to methods with which a desired microscope image is provided.

BACKGROUND

Modern microscopes are highly complex systems that have a wide range of setting options. Microscope settings and the microscope components employed must be selected as a function of a desired sample analysis. The ideal settings depend not only on the sample and the sample preparation as such, but also on the objective of the analysis. For example, a microscope user may wish to analyze a cluster of biological cells in a sample, or alternatively a single cell or specific cell organelles that require illumination settings suitable for a fluorochrome. A user usually begins by describing a planned imaging from an applicative standpoint, i.e. what is to be imaged. Setting the optimal technical imaging parameters for obtaining the desired image data, however, presupposes a high level of expertise and experience. Although microscopes increasingly offer automated processes for the enhancement of user comfort, the transfer of the applicative experiment description into technical parameter settings for imaging represents a major obstacle for many microscope users. In the absence of sufficient expertise, oftentimes only meagre results are achieved following a relatively large expenditure of time and effort in order to perform the necessary settings.

Voice-controlled systems for microscopes are known, e.g. voice-controlled surgical microscopes that use machine-learned language models as described in CN 112149606 A. A voice command is compared with stored commands relating to, e.g., a zoom or a white balance. DE 10 2020/108 796 A1 describes another voice-controlled surgical microscope, wherein a surgeon can use voice commands to switch from one phase with predefined microscope settings to a next phase with other predefined microscope settings. Voice commands thus indicate a specific microscope setting or a set of pre-saved microscope settings in known (surgical) microscopes, so that voice commands replace the input of a similar command via mouse, touchscreen or keyboard, see also paragraph [0030] in US 2018/0 348 500 A1. This is also the case in a system as described in McDermott, S., et al., "Controlling and scripting laboratory hardware with open-source, intuitive interfaces: OpenFlexure Voice Control and OpenFlexure Blockly", arXiv: 2209.14947v2 [physics.ins-det] 2 Feb. 2023, or also in Holburn, D., et al., "Voice Control of the Scanning Electron Microscope Using a Low-Cost Virtual Assistant", Microsc. Microanal. 27 (Suppl 1), 2021, doi: 10.1017/S1431927621009685. A user can give voice commands here such as "Autofocus", "Capture image", "Move x-axis by 100 steps", whereupon the microscope implements these commands accordingly. Known voice-controlled systems thus do not help with the aforementioned issue of translating an applicative experiment description into technical parameter settings for imaging. Instead, the voice commands must specify the technical parameter settings for imaging. It is not possible to utilize an experiment description in natural (complex) language.

Imaging programs of modern microscopes provide a virtual assistant (wizard), which simplifies operation but does not overcome the aforementioned problems. Wizards are generally unable to implement complex requirements, react to results, ask the user follow-up queries, and can only follow predefined sequences even if these are unsuitable for a given experiment. Extending a wizard to new conditions is only possible using modules that must be specially programmed and thus represents a significant investment in terms of time and money.

Similarly, an ideal processing of captured images or raw data requires considerable expertise and an additional investment in terms of time. Although good results can generally be achieved with standard settings of image processing algorithms or learned models, processing parameters must be set individually for an optimal image quality, in particular as a function of the employed sample and image properties such as the signal-to-noise ratio.

As background to the invention, reference is also made to the following prior art:

Vaswani, A., Shazeer, N., Parmar, N., Uszkoreit, J., Jones, L., Gomez, Kaiser, L., Polosukhin, I.: "Attention Is All You Need", arXiv: 1706.03762v5 [cs.CL] 6 Dec. 2017.

This article describes neural networks called transformers. While conventional recurrent models process an input sequence sequentially, a transformer comprises attention blocks which respectively process an input sequence as a whole and not sequentially. When attention blocks are used within an encoder, this is referred to as a transformer encoder with self-attention blocks. An embedding is first calculated for each input element (token) of a sequence, wherein the token embedding is also referred to simply as a token for the sake of linguistic simplicity. A token can correspond to a word or word part, wherein the sequence can be a word sequence or a plurality of sentences. The tokens of a sequence are provided with a positional encoding and are input into a self-attention block, which calculates three representations for each token by means of a matrix multiplication, which are referred to as query (Q, query vector), key (K, key vector) and value (V, value vector). Among other things, for a token (hereinafter token A), the associated Q vector is multiplied by a K vector of another token, then the softmax function is applied and a multiplication is performed with the V vector of the other token. This is carried out for the token A for all other tokens in the sequence. The result of the calculation is the output of the self-attention block for the token A. An associated output is calculated for every other token in the sequence in the same manner. These outputs form the inputs for the next self-attention block. A sequence of tokens is typically input into a plurality of self-attention blocks used in parallel, which is referred to as multi-head attention. The outputs calculated by the last self-attention block of an encoder for the tokens of a sequence are also referred to as the final hidden state embeddings of the tokens.

Analogous to a transformer encoder, a transformer decoder is a network with self-attention blocks that use elements of an input sequence together in a calculation in order to estimate the most probable next token for the sequence. This next token then becomes part of the input sequence for generating the next token. A self-attention block performs the same calculations as described with reference to the transformer encoder.

In a transformer encoder-decoder, a plurality of consecutive attention blocks are used, wherein the Q vectors come from the tokens of the decoder, and the K and V vectors come from tokens (final hidden state embeddings) of the encoder.

With respect to transformer encoders, reference is also made to the article:

Devlin, J., Chang, M. W., Lee, K., Toutanova, K.: "Bert: Pre-training of Deep Bidirectional Transformers for Language Understanding". arXiv: 1810.04805v2 [cs.CL] 24 May 2019.

This article describes a transformer encoder in which a start token, which is referred to as a special classification token ([CLS] token), is placed before an input sequence. From an input sequence, the transformer encoder calculates, inter alia, the final hidden state embedding of the [CLS] token, which contains information of the entire sequence due to its application in conjunction with the other tokens in the calculations performed in the self-attention blocks. A training of the transformer encoder is carried out first in the form of a pre-training using collections of text, e.g. by masking a word or token of the training data which is to be predicted by the transformer encoder. After the pre-training, a further network layer is appended to the transformer encoder, and a further training (fine-tuning) is carried out using other training data, e.g. training data for a classification task. In the process, the final hidden state embedding of the [CLS] token is mapped from the last network layer or layers to a class.

The input sequence for a transformer encoder does not have to contain text, or not exclusively, but can rather comprise image data as described for the network known as Vision Transformer in:

Dosovitskiy, A., Beyer, L., Kolesnikov, A., Weissenborn, D., Zhai, X., Unterthiner, T., Dehghani, M., Minderer, M., Heigold, G., Gelly, S., Uszkoreit, J., Houlsby, N.: "An image is worth 16×16 words: Transformers for image recognition at scale", arXiv: 2010.11929v2 [cs.CV] 3 Jun. 2021;

Wu, H., et al, "CvT: Introducing Convolutions to Vision Transformers", arXiv: 2103.15808v1 [cs.CV] 29 Mar. 2021.

Transformer decoders have become popular inter alia through the networks known as GPT, as described, e.g., in:

Radford, A., Narasimhan, K., Salimans, T., Sutskever, I. (2018). "Improving Language Understanding by Generative Pre-training", https://web.archive.org/web/20200609115647/https://cdn.openai.com/research-covers/language-unsupervised/language_understanding_paper.pdf After a first training (pre-training) of the model, a further training (fine-tuning) can be carried out using reinforcement learning from human feedback in order to increase the probability of a desired (text) generation, as described, e.g., in:

Lambert, N. et al., 9 Dec. 2022, "Illustrating Reinforcement Learning from Human Feedback (RLHF)" https://web.archive.org/web/20230102122855/https://huggingface.co/blog/rlhf OpenAI (2023), "GPT-4 Technical Report", https://web.archive.org/web/20230314180351/https://cdn.openai.com/papers/gpt-4.pdf OpenAI (2020), "Language Models are Few-Shot Learners", arXiv: 2005.14165v4 [cs.CL] 22 Jul. 2020

A text input can also be processed together with input image data as described, e.g., in the article "GPT-4 Technical Report" cited in the foregoing.

Recurrent neural networks such as LSTMs represent an alternative to transformers even if they often do not achieve the same output quality as transformers, cf.:

Hochreiter, S., and Schmidhuber, J.: "Long Short-term Memory" in Neural Computation 9 (8): 1735-1780 December 1997, DOI: 10.1162/neco.1997.9.8.1735

As further background, reference is made to US 2020/0 371 333 A1, which describes a machine-learned verification model for checking an image processing result.

SUMMARY

It can be considered an object of the invention to provide a microscopy system and methods that provide a microscope image with desired properties without requiring a user to have expertise in setting microscope parameters or processing parameters required to provide the image.

This object is achieved by the microscopy system and the methods with the features of the independent claims.

A microscope is controlled by a computer-implemented method according to an embodiment of the invention. A textual input describing at least one desired microscope image and an employed sample is received. At least one overview image of the employed sample is also received. The textual input and the overview image are input into a large language model, which is a machine-learned neural network trained to process the textual input and the overview image together in order to calculate, as a function of the employed sample, microscope settings for capturing a microscope image that corresponds to the desired microscope image. A microscope image is then captured by the microscope with the microscope settings calculated by the large language model.

By means of the invention, a user can, in particular via a voice input, describe an experiment from an applicative standpoint and name properties of microscope images to be captured without having to name or specify the microscope settings per se. For example, a user can tell the large language model whether a single cell of a particular type or a cell cluster of the sample should be imaged. The large language model uses this information to identify the appropriate magnification for capturing either a single cell or a cell cluster, while the overview image is used to navigate to an appropriate location where the desired cell(s) is (are) present. Imaging parameters such as illumination intensity or fluorescence settings can be ascertained by the large language model as a function of the textual input and the overview image without the user having to specify the illumination intensity or fluorescence excitation or detection channels. This enables a high-quality imaging without requiring significant expertise of the user or a laborious performance of manual settings.

A microscope image is processed by a computer-implemented method according to a further embodiment of the invention. At least one microscope image of a sample is received. A textual input describing a desired image processing is also received. The textual input and the microscope image are input into a large language model, which is a machine-learned neural network trained to calculate processing parameters for processing the microscope image from the textual input and the microscope image. The microscope image is processed using the calculated processing parameters.

It is advantageously not necessary for a user to specify all the processing parameters for processing the microscope image per se; instead, a textual description of the desired image processing is sufficient, which the large language model uses together with the microscope image to ascertain the processing parameters. For example, it is possible for one of a plurality of provided denoising algorithms to be selected for a denoising as a function of a sample type, wherein specific values of regularization parameters of the algorithm affect the quality of the processing result, and ideal values depend on, e.g., the sample type and the signal-to-noise ratio in relevant image regions. A microscope image can thus be processed with ideal processing parameters without it being necessary for a user to have detailed knowledge of employed image processing programs or to carry out processing settings him- or herself.

A computer-implemented method of a further embodiment of the invention relates to the retrieval or providing of a desired microscope image. A textual input describing a desired microscope image is received and input into a large language model. The large language model is a machine-learned neural network trained to calculate/derive desired microscope image properties from at least the textual input and to load a particular microscope image from a database containing microscope images as a function of the desired microscope image properties.

Large databases with, e.g., tens of thousands or hundreds of thousands of microscope images are often available in which microscope images are either incompletely annotated or not annotated at all. Although the database may contain one or more microscope images that meet the specifications of a user, finding and retrieving these microscope images is rendered very difficult by the lack of annotations. In different variants of the invention, the large language model can select a suitable microscope image in the database based on a simple textual input of a user without precise specifications from the user or fully annotated image data. Large databases can be made accessible and utilized in a more efficient manner this way.

A microscopy system of the invention comprises a microscope for imaging and a computing device configured to carry out one of the computer-implemented methods.

A computer program of the invention comprises instructions which are stored on a non-volatile data storage medium and which, when the program is executed by a computer, cause the computer to execute one of the computer-implemented methods.

Optional Features

Variants of the microscopy system according to the invention and of the methods according to the invention are the object of the dependent claims and are explained in the following description.

Microscope Settings

Microscope settings or microscope parameters that are ascertained by the large language model can be at least one or in particular all of the following settings:

- a magnification, in particular a selection of an objective and/or a magnification set by a zoom optic so that, e.g., either a single cell organelle or a cell cluster is contained in the microscope image in accordance with a user specification; the selection of the objective occurs as a function of a calculated magnification to be set and can also occur as a function of the numerical aperture of the objective and a working distance;
- an imaging speed, in particular a pixel dwell time, scanning speed or resolution of a scan;
- a location of a sample region to be analyzed, of which one or more images are captured, and an associated sample stage position;
- a contrast method, e.g., phase contrast microscopy, differential interference contrast (DIC), Hoffmann modulation contrast, bright-field or dark-field measurements, fluorescence microscopy, confocal microscopy, two-photon or multiphoton microscopy, polarized light microscopy, interference microscopy, digital holographic microscopy (DHM), or Fourier ptychography microscopy;
- an illumination power or intensity; a duration of a sample illumination;
- a camera exposure time, a pixel size of combined camera sensor elements or generally other detection parameters;
- general light path parameters, e.g., mirrors, filters and a pinhole size;
- a focusing and in particular an aperture diaphragm that affects the depth of field;
- a condenser setting, in particular the setting of a condenser diaphragm and/or condenser height, in accordance with the selected magnification;
- excitation wavelengths to be used in the case of fluorescence measurements, in particular as a function of employed stains and sample structure types of interest;
- a number of detection channels and properties of the detection channels, in particular of a respective wavelength range;
- a camera sensitivity.

The microscope settings can also specify whether a single image is to be captured, whether an image stack consisting of a plurality of images staggered along the optical axis is to be captured, or whether a time series is to be captured in which the same sample region is analyzed at time intervals by means of single images or image stacks. It is also possible for an entire experiment process with a sequence of different settings and imaging events to be defined by the microscope settings ascertained by the large language model. In addition to the aforementioned settings, it is also possible for it to be specified for an experiment process, inter alia, which sample wells (in the case of multiwell plates/multi-chamber slides) are to be captured with which settings, as not all wells are always part of the experiment and these are often subdivided into specific experimental lines of inquiry. In the experiment process, it is also possible to specify time intervals between measurements, the finding or maintenance of Z-stack settings and focal planes, or the reinitiation of an experiment that is to be repeated.

The microscope settings are set by the large language model so that at least one microscope image captured with these settings corresponds to the desired microscope image. This can be understood to mean that the captured microscope image and the desired microscope image correspond in microscope image properties, which are derived by the large language model from the received inputs.

Textual Input

The textual input can be created by a user via a voice input or via an input device on a microscope or computer. In the case of a voice input, a speech-to-text processing can follow. It is also possible, however, for the input to be created by the user directly in text form, e.g., by keying it in via a chat interface, a command line or a script API. In particular, a keyboard, a computer mouse, a joystick or a touch-sensitive screen can be employed as an input device.

The textual input can be written in a natural language, or in a technical or domain-specific language, e.g. in a programming language, wherein the textual input is provided, e.g., as an XML file.

It is also possible to utilize a graphical interface via which, e.g., a slider can be moved. In contrast to conventional sliders (optionally also available) which indicate microscope settings, e.g. a laser illumination intensity, directly, the aforementioned slider can be used to describe a property of the desired microscope image or of the employed sample. For example, a slider can be used to set a width/length of a microscope image to be captured to be approximately 100 times, 10 times, 2 times, 1 time or 0.5 times as large as a diameter of a cell of an employed biological sample. Depending on this setting, the microscope settings are performed automatically so that accordingly only part of a cell, an entire cell or a plurality of entire cells are visible in a subsequently captured microscope image.

In particular when at least one microscope image is to be captured by means of the textual input, the textual input can indicate at least one of the following:
- which objects should be visible in the desired microscope image, in particular an object type and a number of objects. For example, a distinction can be made between a single cell organelle, a single cell and a cell cluster. The textual input can also indicate a cell type or cell organelle type, for example cell nucleus, Golgi apparatus, endoplasmic reticulum, mitochondria.
- the type of sample involved, e.g. which tissue or living organism biological cells come from.
- what dyes/colourants or stains were employed in a sample preparation, in particular what histochemical stains or fluorescent dyes were employed.
- whether a bleaching of a sample (caused by a high illumination light intensity) is permitted. This can be indicated using a scale according to which, for example, a bleaching is not permitted under any circumstances, a bleaching is only permitted if it is necessary to achieve an adequate image quality, or a bleaching is always permitted to achieve the best possible image quality.
- whether priority is to be given to a high image quality, i.e. a high signal-to-noise ratio, or to a conservation of the sample.

The textual input can also comprise data from various sources. For instance, a user can input information in at least one of the ways described above, while the textual input (or a separate input of contextual information) can additionally comprise provided textual information regarding the employed sample and/or a current experiment. For example, information regarding a preceding sample preparation and/or a sample type can be available in a data storage medium for an employed sample. This information can be input into the large language model together with the input of the user as textual input. Textual information can also be present in the form of text or a machine-readable 1D/2D barcode on a sample carrier; in this case, the textual information can be read through analysis of an overview image and input into the large language model as a part of the textual input together with a user input. The textual input can also comprise texts created by a computer program, for example by a virtual assistant, which proposes a description of a measurement or experiment to a user for a planned experiment. The measurement description can state, for example, that a single biological cell of a particular cell type is to be localized, that a time-series measurement is then to be carried out which should comprise all stages of a cell division and that, although an illumination intensity should preferably be high for a good SNR, under no circumstances should cells be damaged by an excessive illumination intensity. If a user confirms the proposed measurement description, where necessary following a revision, it is input into the large language model as textual input.

If the textual input is used to process a microscope image, the textual input can, for example, indicate the type of sample depicted and/or which dyes or stains were employed in a sample preparation, as described in the foregoing. The textual input can also indicate a processing objective that is to be achieved by an image processing, for example a denoising, a resolution enhancement, a deconvolution and/or a SIM calculation (SIM stands for Structured Illumination Microscopy, in which a higher-resolution image is calculated from a plurality of images with different illumination structures).

Processing Parameters for an Image Processing

The textual input and a captured or loaded microscope image can be used to ascertain processing parameters for processing the microscope image. In this case, the textual input comprises a description of a desired image processing in addition or as an alternative to the content of possible textual inputs described in the foregoing. The textual input is input together with the microscope image into the large language model, which is trained to calculate the processing parameters from the textual input and the microscope image. The microscope image is then processed by an image processing program using the calculated processing parameters.

The processing parameters can in particular specify one or more of the following:
- a selection of one of a plurality of deconvolution algorithms (which in particular calculate a deconvolution by means of an estimate of the point spread function PSF of the microscopy system), one of a plurality of resolution enhancement algorithms, or one of a plurality of denoising algorithms. The suitability of an algorithm can depend, inter alia, on an employed sample type and/or sample carrier type. It is thus possible for different algorithms with the same function to be provided, e.g. different denoising algorithms for in particular different sample types. One of the algorithms is then selected as a function of at least one sample type.
- parameters to be specified for a (selected) deconvolution algorithm, resolution enhancement algorithm or denoising algorithm, or for a SIM calculation (SIM: Structured Illumination Microscopy). The parameters can relate, e.g., to a number of iterations to be performed or to a regularization term, in particular a regularization function and regularization parameters. The processing parameters can also be used to estimate a PSF of the imaging, wherein the PSF is subsequently used in the image processing. Parameters of a denoising algorithm can be set differently in particular depending on the noise level of a microscope image to be processed.
- a virtual staining of particular sample structures or some other virtual modification of the contrast type, for example a change between phase-contrast, bright-field, DIC or fluorescence images.
- a change in a depth of field, in which a higher or lower depth of field is simulated mathematically and blurred structures are accordingly made either sharper or blurrier, while structures in a focal plane remain essentially unchanged.

Image processing programs can also relate to other functions in addition to the algorithms mentioned by way of example. In particular, image processing programs can be used to enhance the image quality, to increase the visibility of particular object or structure types (e.g. via a virtual staining or a virtual change of the contrast type) or to suppress undesirable object or structure types, in particular via a background suppression or an artefact removal. It is also possible to calculate segmentation masks. An output of an image processing program can be an image, although other processing results are generally also possible, e.g. a classification regarding object types or image properties, or a regression regarding physical values of particular objects (e.g. their size or geometry), or a calculation of statistical values of objects (e.g. a number of objects of a particular type or a size distribution of objects of a particular type). The cited image processing programs can be machine-learned models or can also be formed by classical algorithms without learned models. The processing parameters can specify a selection of a learned model or algorithm and, where necessary, parameters to be set of the algorithm or model.

To achieve a desired image processing, a new training of an image processing model can also be necessary, wherein, inter alia, the microscope image can be utilized for the training data. The large language model can be designed to initiate a new training, in particular to propose training parameters or hyperparameters (e.g., an augmentation of the training data, a learning rate or a learning rate progression) and suitable model architectures. The large language model can optionally also be designed to evaluate for a given microscope image whether a correct processing is expected to be possible with an existing model or whether a new training should be carried out.

Structure and Training Data of the Large Language Model

The large language model is a deep artificial neural network which receives (among other things) a text from a user as input and generates an output that specifies parameters for a subsequent image generation. In contrast to simple machine-learned models, a large language model comprises a number of model parameters to be defined in the model training in excess of ten million, in particular in excess of a billion parameters.

The large language model can comprise, for example, a transformer encoder (as described in the introduction with reference to the article "Bert: Pre-training of Deep Bidirectional Transformers for Language Understanding") and optionally a vision transformer for simultaneous image processing. It is alternatively or additionally possible for a transformer decoder to be provided, with characteristics as described in the introduction with reference to the prior art. The design as a transformer encoder-decoder described in the introduction is also possible. More generally, it is also possible to implement an encoder or decoder with self-attention blocks in which, instead of using Q, K and V vectors of a transformer in a calculation, a different matrix calculation is carried out using vectors calculated from the tokens. In principle, it is also possible to design the large language model using a model formed as an LSTM as described with reference to the prior art. In variants of the embodiments described in the following, the described transformers can also be replaced with a different structure, in particular with an LSTM or CNN in the case of image data.

Different embodiments of the large language model comprise a (transformer) encoder. The textual input is converted into a sequence of tokens in a manner known per se, e.g. on the basis of a word or word part. In addition, a special token is added, which is called a start token or [CLS] token in the following. This can precede the token of the textual input, although in principle another position in or after the sequence is also possible. The values of the start token can be predefined by a training of the large language model. The encoder calculates a mapping of the textual input with the added start token to an output, which can comprise an output vector (hidden state embedding or representation) for each token. In the case of a transformer encoder, the hidden state embedding of the start token contains information of all other tokens of the textual input, wherein this information is incorporated in the embedding of the start token through calculations carried out with Q, K and V vectors in self-attention blocks. After the processing of the input by the encoder, the position of the start token in the embedding space serves as a feature vector for the further processing. The hidden state representation of the start token is input into a mapping program, which can be considered part of the large language model. It is designed to calculate a mapping of the feature vector, i.e. of the hidden state representation of the start token, to the target parameters (in particular values of the microscope settings). The mapping program can comprise, e.g., a linear mapping or a further machine-learned network, for instance a multilayer perceptron. This approach has similarities with the use of the [CLS] token in the BERT and ViT models cited in the introduction. As with a ViT, input image data (in particular an overview image here) can also be processed by the encoder so that image information is incorporated in the feature vector or a separate feature vector is generated for the overview image. It is also possible to use a pre-trained language model, in particular of the prior art, as the transformer encoder. The mapping program/the further machine-learned network can be designed, e.g., as a regression model or as a classification model. It can be learned after a completed training or pre-training of the transformer encoder, for example by a supervised learning. In the supervised training, desired sets of microscope settings are specified for textual inputs. The further machine-learned network thereby learns to calculate a mapping of a hidden state embedding of the [CLS] token to a set of microscope settings, or to calculate a mapping of a hidden state embedding of the [CLS] token and of a feature vector for the overview image to a set of microscope settings. The training data can be collected actively or be obtained through passively observing a user. The training can optionally be implemented with the aid of reinforcement learning. As described in more detail in the following, an additional evaluation model can be used to assess whether microscope images captured with the ascertained microscope settings represent a successful implementation of the textual input. In principle, it is also possible to use the training data mentioned in the foregoing for a joint training in which a training or fine-tuning of the transformer encoder is carried out in addition to a training of the other machine-learned network.

Training data of the large language model can in particular contain one or more of the following:

microscope user manuals;

chats between microscope users and microscope service staff, wherein the chats contain questions and answers pertaining to the use of microscopes and troubleshooting. Chats can comprise conversations in text form or transcribed conversations, e.g., phone calls.

records of training sessions/events on microscopes, in particular on the use of microscopes, or the training of service staff in microscope user support. In the case of oral trainings, the records can also be transcribed recordings.

The aforementioned training data describes in particular how microscope settings are to be selected, inter alia as a function of sample types or desired properties of an image to be captured. This training data is useful in particular in the case of a large language model designed as a transformer decoder.

The large language model can also be formed by fine-tuning an existing large language model for which in particular a pre-training has already occurred. The aforementioned training data, e.g. microscope user manuals, can be training data of the fine-tuning. The fine-tuning can optionally be self-monitored, i.e. the model tries to reproduce microscope user manuals or other training data in the training.

Using reinforcement learning, desired responses can be reinforced and undesired responses suppressed in the fine tuning, as described, e.g., in the article "Illustrating Reinforcement Learning from Human Feedback (RLHF)" cited in the introduction. Either microscope settings ascertained by the large language model and/or microscope images captured with the ascertained microscope settings can be evaluated. The evaluation can be carried out by a human or by a learned model, in particular by the large language model. The captured microscope images can be images captured after the calculation of the microscope settings by the large language model; alternatively, given microscope images from an image collection can be used, wherein the microscope settings respectively used to capture the given microscope images are known. It is thus possible to select the given microscope image whose microscope settings used for imaging correspond to the microscope settings ascertained by the large language model. A user or model then evaluates whether the desired properties of a microscope image according to the textual input and the highest possible image quality are fulfilled in the selected microscope image. This way, no new microscope images or at any rate very few need to be captured for the reinforcement learning, which makes the training faster and more cost-effective.

In principle, a fine tuning can also be carried out by means of a few-shot (or one-shot) learning/prompting. In this case, the textual input is preceded by a given text, optionally with associated image data. The given text relates to a mapping of a textual input to the data to be output by the large language model (microscope settings and/or processing parameters). For example, multiple examples of a textual request to capture a microscope image with particular properties and associated microscope settings for capturing corresponding microscope images can be used in the few-shot prompting. This prompts the model to output microscope settings that match the textual input. This type of fine-tuning typically does not change the learned model parameter values.

The large language model can also comprise a transformer encoder-decoder as described, e.g., in the article by Vaswani et al. cited in the introduction. In this case, the training can be a supervised translation from textual input to microscope settings. The training data comprises a natural-language or technical user input as a textual input and an associated desired parameter output (set of microscope settings). A transformer encoder-decoder can be advantageous in particular when the output is to occur in a technical or domain-specific language. For example, the microscope settings can be output by generating an XML file that is written in a particular programming language and contains commands for setting the microscope. This setup can be particularly suitable when the textual input of the user is more like a formal experiment description to be translated into microscope settings, and an interactive conversation with the large language model does not necessarily occur. A transformer decoder is also suitable for outputting the microscope settings in a technical or domain-specific language.

Variations in training processes are possible across all model types. For example, a transformer encoder can in principle also be trained in an unsupervised manner like a transformer decoder.

The large language model can comprise a plurality of machine-learned models (submodels) that were learned in a joint training or separately. Different submodels become active as a function of a specific task. Different submodels can be provided, among other things, for an image analysis, at least one of which is selected as a function of, e.g., a sample type; different submodels can also be provided for issuing follow-up queries, for determining whether sufficient information is available for the creation of microscope settings or processing parameters, and for generating the microscope settings. At least one of the submodels is a language model for processing the textual input.

The large language model or at least one submodel can also comprise one or more convolutional neural networks (CNN), in particular in a U-Net architecture. Other model architectures of a deep neural network are also possible.

Follow-Up Query Loop

Simple language models of the prior art only detect microscope settings specified by the user, but are not able to infer suitable microscope settings from more abstract user descriptions. As a further difference vis-à-vis the prior art, the large language model of the invention can be designed to interactively assist the user in the performance of microscope settings by submitting follow-up queries or comprehension questions to the user in order to infer suitable microscope settings.

The large language model can be trained to ascertain whether based on a received textual input all microscope settings to be set, i.e. all required microscope settings, can be set or whether a follow-up query to a microscope user is necessary for one of the microscope settings. In the event of a follow-up query, the subsequently received user response is input into the large language model as further textual input. In the event of a follow-up query, the large language model is trained not to ask for the value of the microscope setting, but to query a property of the sample, of the desired microscope image or of an experiment to be carried out that is relevant for this microscope setting. A follow-up query can be, e.g., whether a bleaching of the sample is acceptable or, alternatively, whether a relatively long measurement duration should be selected for a sufficient signal-to-noise ratio. In contrast, no questions are asked about the specific value of the microscope setting, e.g. the wattage of an illumination device.

If the response of the user implies that the calculated microscope settings are not acceptable (if the user does not permit, e.g., a bleaching of the sample, but the microscope settings define a high illumination intensity and the user also does not want a long measurement duration), the large language model can vary other parameters to achieve the desired goal, e.g. a particular SNR; in the cited example, it is possible to avoid these effects, for instance, by changing the aperture diaphragm or increasing the pinhole size of a confocal imaging, provided that the user has not made any conflicting specifications (e.g. regarding the depth of field).

Further examples of follow-up queries submitted to the user could be: "Which dyes are of interest?" "Is the process time-sensitive?" or "Which sample (of a plurality of samples on a sample carrier) should be analyzed?"

An evaluation of whether it is necessary to submit a follow-up query to the user can occur, e.g., by means of a special coding in an output of the large language model. Alternatively, a dedicated model can be used for this purpose, in particular a transformer-encoder model of the large language model, which carries out a classification regarding a necessity of follow-up queries.

The large language model can comprise one or more transformer encoders and transformer decoders for different tasks. For instance, a transformer encoder can be used to calculate the microscope settings from inputs into the large language model (in particular from the textual input and user responses received for any follow-up queries). On the other hand, the large language model can comprise a dedicated model, e.g. a transformer decoder, for the creation of follow-up queries for a user. This enables a textual interaction. The transformer decoder can be trained with the microscope user manuals and other training data mentioned in the foregoing.

An input into the large language model comprises the context of the conversation with the user up to that point so that the model "remembers" the preceding course of the conversation and can use it to calculate follow-up queries or microscope settings. For a particular session, an input into the large language model can comprise in particular: all user requests; all follow-up queries of the model with associated responses of the user; parameter settings/microscope settings generated up to that point, the associated images and/or their evaluation by an (image-to-image) evaluation model; as well as any existing contextual knowledge. The contextual knowledge can come from databases and relate to the provided sample, sample carrier and previous measurements, while it is possible to distinguish between different users. A knowledge of previous measurements helps the large language model in particular when a user refers to previous measurements in the textual input or a response, for example with the instruction that the same dyes should be rendered visible as in measurements from the previous week. It is generally not possible with conventional language models used with microscopes, in contrast, to take into account contextual knowledge in the definition of microscope settings.

In variants of the invention that relate to the processing of a microscope image, the large language model can also be configured to issue follow-up queries when a desired image processing is not yet described with sufficient precision by the current textual input so as to allow the necessary processing parameters to be defined with a predefined minimum level of reliability. The follow-up query can relate, e.g., to an employed sample type or an employed imaging technique.

Processing the Overview Image

The large language model can contain an (in particular machine-learned) image analysis model. This calculates analysis results from the overview image, which the large language model uses in a calculation together with the textual input in order to determine the microscope settings. The image analysis model can optionally be learned separately from another part of the large language model, for example separately from a transformer encoder that calculates a feature vector from the textual input. Alternatively, the large language model can also be designed directly for image processing without a separately trained image analysis model, for example as described in the articles cited in the introduction.

The analysis results calculated by the large language model, in particular by an image analysis model of the large language model, based on the overview image can specify, for example, one or more of the following:

a sample carrier type, e.g. whether a slide, dish, chamber slide or multiwell plate is present;

a sample type, e.g., adherent/fixed cells, stained/unstained tissue sections, rock sample, or electronic components;

whether chemical dyes were used for a sample preparation and, if so, what chemical dyes were used;

a type of experiment, e.g., single image, long-term experiment or high temporal resolution;

one or more focus positions, i.e. one or more height planes of the sample to be analyzed and the associated microscope settings for focusing on the plane(s) of elevation;

a state or degree of contamination of a sample carrier or sample, for example a fill level in cases of liquid samples, discolouration or bacterial infestation of liquid biological samples, or a presence of droplets due to condensed sample liquid;

locations of relevant regions, e.g., positional data of the sample or sample regions, coverslips, sample chambers, or regions containing text; and/or information content of text or of a barcode on a sample carrier.

These analysis results can be processed together with the textual input by the large language model in order to calculate microscope settings. Such a joint processing stands in contrast to a separate processing, in which a result is calculated for a textual input independently of the image data and another result is calculated for the image data independently of the textual input.

The textual input (or a piece of information extracted from the same by the large language model) can optionally be taken into account in the calculation of analysis results from the overview image. If the textual input names, e.g., the sample type, this can be taken into account when localizing and identifying sample regions.

In addition to analysis results of the image analysis model, it is generally possible for other contextual knowledge regarding the respective sample to also be input into the large language model together with the textual input.

Image Evaluation and Adjusted Imaging

By evaluating captured microscope images, it is possible to establish whether the implementation of the textual input was a success or whether a new imaging should be carried out with adjusted microscope settings.

The large language model can be trained to derive microscope image properties from the textual input which the microscope image to be captured should fulfil in order to comply with the textual input. Microscope image properties can indicate, e.g., that particular object types (for example particular cell organelles) should be visible or comply with a minimum/maximum pixel size in the microscope image. What kind of microscope image properties should be fulfilled is consequently not predefined, but is derived from at least the textual input. Further examples of microscope image properties are an image quality (e.g., SNR, image noise, contrast, image sharpness, depth of field, overexposure, shading/shaded sample regions, resolution), a contrast type, a sample staining, a sample state, or the presence of artefacts (e.g. contaminants; image processing errors caused by a processing of captured raw data or imaging artefacts such as reflections of light sources).

At least one machine-learned image evaluation model calculates associated microscope image properties from the microscope image captured using the microscope settings ascertained by the large language model. Multiple image evaluation models can be provided that are designed to ascertain different microscope image properties. Alternatively or additionally, it is also possible for one image evaluation model to be designed to calculate different microscope image properties. At least one corresponding image evaluation model is selected as a function of the microscope image properties to be fulfilled that are derived from the textual input.

In cases where the microscope image properties of the microscope image comply with the microscope image properties derived from the textual input, the microscope image is used further, e.g., displayed to a user, saved and/or used in a provided workflow. After displaying the microscope image, the large language model can ask the user whether modifications are desired. The user then has the opportunity to add information to the current textual input or to alter information, whereupon the described processes are run through again. In the new pass, the large language model uses both the previous textual inputs of the user and the new specifications of the user and the microscope image or images that caused the user to provide new information. For example, a user can indicate that they are disturbed by blurred structures in the microscope image that are shown superimposed with sharp sample objects. The large language model processes this statement and ascertains as the desired microscope image property that the depth of field should be improved vis-à-vis the previous image; the previous microscope settings are changed, e.g., so that an aperture diaphragm is adjusted or a pinhole of a confocal measurement is reduced. As a result of these changes, other microscope settings can be automatically adjusted to maintain desired properties, for example the illumination intensity can be increased to compensate for a smaller pinhole in order to maintain a particular SNR.

If the image evaluation model ascertains that the microscope image properties of a captured microscope image do not comply with the microscope image properties derived from the textual input, the image evaluation model provides feedback to the large language model. In particular, the microscope image properties of the microscope image can be input into the large language model. The large language model then calculates adjusted microscope settings for capturing a new microscope image, which should bring the microscope image properties of the new microscope image closer to the microscope image properties derived from the textual input. For example, if the captured microscope image does not show a cell organelle to be analyzed with a defined minimum number of pixels in accordance with the textual input, the adjusted microscope settings can specify a higher magnification. If a cell organelle is captured with an adequate size but with an inadequate contrast/image quality, the adjusted microscope settings can specify an increase in illumination intensity.

In cases where adjusted microscope settings are ascertained for the capture of the new microscope image, the large language model can optionally be designed to carry out an evaluation as to whether a follow-up query should be submitted to the user to authorize the capture of the new microscope image due to an effect on the sample or on a measurement duration that results from the adjusted microscope settings. This can be the case, for example, if the illumination intensity is increased and there is consequently a risk of a bleaching of the sample.

The evaluation of captured microscope images can additionally or alternatively be carried out using a learned quality metric, i.e. by a machine-learned model that is specially trained for the purpose of calculating the quality of an image.

Furthermore, the evaluation of a captured microscope image can be carried out by evaluating the similarity to at least one reference image. The similarity can be calculated, e.g., by calculating a mapping into a feature space for the microscope image and the reference image and determining a distance between the representations in the feature space. The similarity can in particular be estimated using techniques known in the field of image retrieval. A comparison with reference images can occur, e.g., when a user provides textual input in the form of the instruction "Capture an image like yesterday". The large language model sets parameters/microscope settings using contextual knowledge (yesterday's parameters) before imaging is carried out. The image evaluation model then compares the captured microscope image with yesterday's image to ensure that the request was executed correctly. In principle, the image evaluation model can also be viewed as part of the large language model, which outputs an evaluation result to another part of the large language model.

Evaluations performed by the image evaluation model and/or additions to the previous textual input performed by a user after viewing a microscope image can be collected for a new/supplementary training of the large language model, e.g. as reinforcement signals, in order to further improve the large language model.

Image Evaluation for an Image Processing

In the case of an image processing of a captured microscope image, the processed microscope image can be evaluated. It is evaluated whether the implementation of the textual input was a success or whether image processing should be repeated with adjusted processing parameters.

The features described in the foregoing in relation to the evaluation of captured microscope images can also apply mutatis mutandis to the evaluation of processed microscope images. In particular, different image evaluation models can be provided, from which one or more image evaluation models are selected as a function of the textual input or ascertained processing parameters in order to evaluate the processed microscope image.

The image evaluation can assess whether the desired processing objectives were achieved as well as whether any processing errors occurred. Processing objectives can be, e.g., a resolution enhancement, a denoising, a suppression of a background or imaging artefact, a deconvolution, a SIM calculation or a segmentation. Processing errors can be reflected by added image artefacts, e.g., bubble-like structures, hallucinated objects (not contained in the original data) and impact or ringing artefacts. Image evaluation criteria can be selected as a function of the processing objective, e.g. whether the image noise is lower or higher than an image noise in the original microscope image. Optionally, the image evaluation only relates to image regions that have been categorized as relevant by an image analysis. For example, an SNR enhancement can be carried out by comparing the SNR for the respective image region of a sample in the original and in the processed microscope image, while an environment/a background is not taken into account or only taken into account to a lesser extent for the determination of the SNR. Added image artefacts can be detected by specially trained models. An image segmentation can be evaluated using a trained verification model that has been trained to detect such segmentation masks or to detect a deviation from the segmentation masks of the training data using correct and/or incorrect segmentation masks. In the event of a negative evaluation result, in particular in the event that the evaluation criterion was not met, the image evaluation models can be designed to output a corresponding error description.

If the evaluation result is positive, the processed microscope image is used further, e.g., displayed to a user, saved, and/or used in a provided workflow.

In the event of a negative evaluation result, however, feedback is sent to the large language model. In particular, the error description generated by the image evaluation model can be input into the large language model. The large language model uses the error description/the evaluation result in the calculation of adjusted processing parameters for a new image processing. If, for example, a hallucination of objects occurred, the large language model selects modified processing parameters for which it is known that a probability of a hallucination is lower (even if losses in terms of a desired processing objective, e.g. a resolution enhancement, have to be accepted as a result).

As described for the evaluation of captured microscope images, the evaluation of processed microscope images can also occur using a learned quality metric or by estimating a similarity to at least one reference image.

Loading Microscope Images (Image Retrieval)

In different variants of the invention, a desired microscope image is retrieved from a database by means of the large language model. The functions of the large language model described in the following can be provided in addition to or instead of the described functions for ascertaining microscope settings and/or processing parameters.

A textual input describing a desired microscope image is received for loading or retrieving a microscope image. As described, the textual input can come from a user, e.g. via a voice input, or from a computer program, e.g. in an automated workflow.

The textual input is input into the large language model, which is trained to calculate desired microscope image properties from the textual input. A microscope image is subsequently loaded from a database that contains microscope images as a function of the desired microscope image properties.

In a simple case, microscope image properties respectively stored for the microscope images of the database are used. However, extensive databases often only exist in a state in which microscope images are not or are only partially annotated with respect to their properties.

In particular, a feature space can be used to automatically find a microscope image with desired properties in a database that contains microscope images that are not annotated or only annotated with respect to some properties. The large language model is trained to calculate a mapping of the desired microscope image properties/features into the feature space. A respective feature space representation is also provided for each microscope image of the database; in other words, by mapping/embedding the microscope image in the feature space, each microscope image is represented as a point in the feature space. The large language model can select and load the microscope image from the database whose feature space representation is closest to the representation of the desired microscope image properties/features. The selected microscope image is then displayed to a user or used in an automated workflow. Instead of a single image, the large language model can also select a plurality of images whose feature space representations exhibit the smallest distances from the representation of the desired microscope image properties.

In particular, the large language model can comprise a text encoder for mapping the microscope image features to a point in the feature space, and an image encoder for mapping the microscope images into the feature space. Both encoders can be transformer-based. Using (partially) annotated microscope images, the relationship between textually described microscope image properties and microscope images is established in a training. Remaining, unannotated or incompletely annotated microscope images can be mapped into the feature space by means of the image encoder after completion of the training. It is thus also possible to calculate a correspondence or similarity to the textual input for microscope images for which no textual annotations are available. A distance between two representations in the feature space acts as a measure of their similarity. The desired microscope image properties can be calculated from the textual input, e.g., by means of a transformer decoder trained for this purpose.

A loaded microscope image can be evaluated as to whether it complies with the textual input. A machine-learned classifier is used to this end, which checks whether the microscope image can be matched with a particular class or domain. A plurality of binary classifiers can be provided for a larger number of classes, wherein one or more of the binary classifiers is selected according to the desired microscope image properties calculated by the large language model. For example, if a desired microscope image property specifies that a nucleus should be visible, a binary classifier trained to evaluate the presence of a nucleus in an image is selected.

In another example, a user can ask in a textual input for a microscope image with cells in a particular cell stage, e.g. the metaphase of a cell division. The large language model calculates a mapping into the feature space/latent space, but there is considerable uncertainty regarding a position in the feature space. The large language model thus submits a follow-up query to the user with a view to a greater restriction of the microscope image, for example it queries whether dead cells (or cells in a different cell stage) may also be visible in the microscope image. The user responds in the negative, and this user response is taken into account in order to calculate a new mapping into the feature space. As a result of the more precise specifications, the uncertainty decreases and the large language model outputs at least one microscope image whose representation in the feature space comes closest to the request. This microscope image can optionally be evaluated by a classifier before being displayed to the user. In this example, a plurality of classifiers are selected that are trained to detect cells in different cell stages. One or more microscope images that have been evaluated as correct are displayed to the user. The user can then refine/modify the textual request, for example by specifying that an image of a contrast type different from the image shown should be selected. The large language model processes the refined specification of the user and the shown image. In this example, based on the refined specification, the large language model uses a classifier for determining the contrast type of the selected image, wherein, e.g., it is determined that a phase contrast image is present. The large language model uses the refined textual request to calculate a new mapping into the feature space and selects at least one closest microscope image. A classifier is used to evaluate whether this microscope image is a phase contrast image—if the evaluation establishes that this microscope image is not a phase contrast image, the image is presented to the user. An interactive cycle is thereby created in which the feedback of the user is used to refine calculations of the large language model and bring the results closer to the user requirements.

Textual inputs and microscope image properties ascertained therefrom can in particular relate to the sample type (e.g. particular cell lines), the imaging type (e.g. a particular contrast type or staining) and the type of image content (e.g. particular events such as a cell division).

Contextual Information

The large language model can be designed to receive and process contextual information together with a textual input. The contextual information can come, e.g., from a data memory, can be metadata of a given image that is processed together with the textual input, or can come from a microscope that is currently in use and relate to, e.g., component specifications or settings of the microscope. A user profile can also be used as contextual information.

In particular, contextual information can also be used by an image analysis model of the large language model or another machine-learned network of the large language model.

The contextual information can specify, among other things, an employed sample type, a sample state, a sample stage, an employed sample carrier, an experiment description and/or descriptions of previous measurements.

By using contextual information, it can be avoided that the large language model has to request corresponding information from the user. The contextual information can also be used by the large language model to check the plausibility of a user specification in the textual input. For example, the contextual information can specify a sample type; if the textual input specifies that cell organelles are to be shown that do not occur in this sample type, the large language model can point out this inconsistency to the user and does not need to calculate microscope settings and capture an image that is likely to be inappropriate.

Contextual information can also come from an image analysis of an image input into the large language model, for example by detecting a font or other objects in the image.

General Features

A microscope image and an overview image can both be understood to be an image that has been captured by a microscope or calculated using measurement data from a microscope. In particular, the microscope image or overview image can be formed by one or more raw images or processed images of the microscope and can comprise 2D image data or a 3D image stack or volumetric data, or alternatively also time-series data for which 2D or 3D image data of the same object was captured at different points in time. The overview image has a larger field of view than a microscope image.

In principle, a structure or object depicted in microscope images and overview images can be any structure or object. Besides the sample itself—e.g., biological structures, electronic elements or rock fragments—it is also possible for a sample vessel, a sample carrier, a microscope component such as a sample stage or areas of the same to be depicted.

"Receiving" an image can comprise the possibilities that the image is captured by the microscope or that an existing image is received, e.g. loaded from a data memory.

The microscope can be a light microscope that comprises a system camera and optionally a separate overview camera. Other types of microscopes are also possible, for example electron microscopes, X-ray microscopes or atomic force microscopes. A microscopy system denotes an apparatus which comprises at least one computing device and a microscope.

The computing device can be designed in a decentralized manner, be physically part of the microscope or be arranged separately in the vicinity of the microscope or at a remote location at any distance from the microscope. It can generally be formed by any combination of electronics and software and can in particular comprise a computer, a server, a cloud-based computing system or one or more microprocessors or graphics processors. The computing device can also be configured to control microscope components. A decentralized or cloud-based design of the computing device can be advantageous in particular when the large language model is executed with specially designed hardware or user feedback is collected for a follow-up training of the large language model.

Descriptions in the singular are intended to cover the variants "exactly 1" as well as "at least one". For example, capturing a microscope image with the microscope settings calculated by the large language model is intended to be understood in the sense that exactly one microscope image is captured or more than one microscope image is captured using the calculated microscope settings.

The characteristics of the invention that have been described as additional apparatus features also yield, when implemented as intended, variants of the method according to the invention. Conversely, a microscopy system or in particular the computing device can be configured to carry out the described method variants. Described training processes of machine-learned networks define properties of the ready-trained network, while additional method variants are formed by executing the described training processes as method steps of a method according to the invention.

BRIEF DESCRIPTION OF THE FIGURES

Further effects and features of the invention are described in the following with reference to the attached schematic figures.

DETAILED DESCRIPTION OF EXAMPLE EMBODIMENTS

Different example embodiments are described in the following with reference to the figures. As a rule, similar elements and elements that function in a similar manner are designated by the same reference signs.

Figure 1:
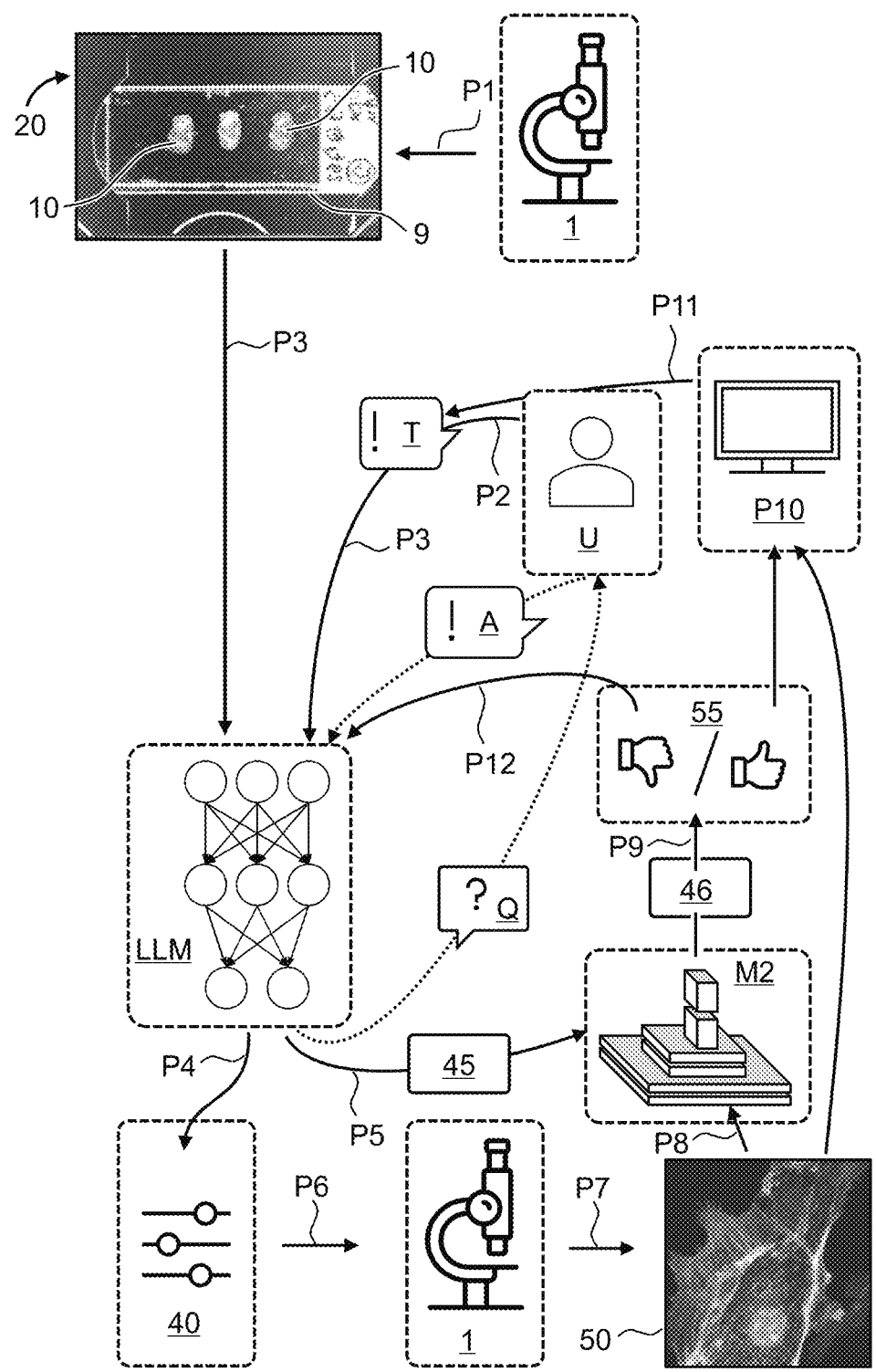
FIG. 1 schematically illustrates processes of an example embodiment of a method according to the invention.

FIG. 1: Method According to the Invention with Large Language Model

An example embodiment of a computer-implemented method according to the invention for controlling a microscope 1 is illustrated schematically in FIG. 1. The method uses a special large language model LLM to capture a microscope image 50 according to wishes of a user without the user having to indicate specific microscope settings.

In process P1, at least one overview image 20 of a sample 10 is received. In the illustrated example, the overview image 20 is captured by an (overview) camera of the microscope 1, although it is generally also possible to load an existing overview image 20 from a memory. The overview image 20 shows a sample carrier 9 with a sample 10, which in this case comprises a plurality of spatially separate sample regions, e.g. a plurality of tissue sections.

In process P2, a textual input T is received from a user U, e.g. by capturing a voice instruction of the user U through a microphone and converting it into text using speech recognition. The textual input T describes a desired microscope image and/or the employed sample. For example, a user can give the voice instruction that an image of a particular biological cell is to be captured. The textual input T thus describes the cell type of interest (as distinguished from other cell types) as well as a magnification, since a (single) cell is to be displayed, as opposed to, e.g., a cluster consisting of a plurality of cells, for which a lower magnification or a larger field of view would be necessary, or a cell organelle, for which only a section within a cell is displayed.

The textual input T and the overview image 20 are input into a large language model LLM in process P3. This is a machine-learned neural network that is trained to process the textual input T and the overview image 20 together in order to calculate therefrom microscope settings 40 for capturing a microscope image that fulfils the descriptions of the desired microscope image. The calculated microscope settings 40 are output by the large language model LLM in process P4.

In process P6, the microscope 1 is controlled according to the microscope settings 40. In process P7, at least one microscope image 50 is captured with the microscope settings 40 calculated by the large language model LLM. The calculated microscope settings 40 can also comprise a sequence of successive microscope settings to be set, with which a plurality of microscope images are captured.

The microscope image 50 is input into a machine-learned image evaluation model M2, process P8, which calculates microscope image properties 46, e.g. properties relating to an image quality (in particular contrast, image sharpness or signal-to-noise ratio) and relating to depicted structures or objects (in particular an object detection in order to determine whether cells of a particular cell type are depicted in the microscope image 50 and, if so, how many). The image evaluation model M2 uses microscope image properties 45 calculated by the large language model LLM in process P5 that the microscope image 50 should fulfil. The microscope image properties 45 specified by the large language model LLM can be derived from the textual input T and the overview image 20 and can indicate, inter alia, a type and number of objects to be shown. The image evaluation model M2 can comprise a plurality of object detection models for detecting different types of objects, wherein one or more of the object detection models for processing the microscope image 50 are selected according to the microscope image properties 45 calculated by the large language model LLM.

In process P9, an evaluation result 55 is calculated, which indicates whether the microscope image properties 46 calculated by the image evaluation model M2 for the microscope image 50 correspond to the microscope image properties 45 specified by the large language model. Process P9 can in principle be carried out by the image evaluation model M2 or by the large language model LLM. If the evaluation result 55 is positive, the microscope image 50 is used further in process P10, e.g. displayed to the user U. In process P10, it is also possible to go ahead with a provided workflow that is executed after a successful capture of a microscope image 50 with the microscope image properties 45 calculated by the large language model LLM, e.g., navigating to and analyzing further sample positions, capturing further microscope images of the same sample region with a different contrast type, or performing a time-series measurement in which images of the same sample region are captured at different points in time.

After viewing the microscope image 50 in process P10, the user U can make additions to the textual input T in process P11. In particular, the user U can replace and/or refine previous specifications. The addition to the textual input is input into the large language model LLM, which calculates modified microscope settings based on the previous information and the new input in order to capture a new microscope image. A cycle in which an imaging occurs with settings calculated by the large language model LLM and feedback from the user is taken into account can be repeated multiple times in this manner. The user U is thus provided with an interactive control of imaging using textual inputs T. For example, as an addition to the textual input T, the user U can say: "Highlight cell nuclei better". The previous microscope settings 40 are then modified, e.g. by increasing the intensity of an illumination wavelength for the fluorescence excitation of a dye used to stain cell nuclei.

If the evaluation result 55 indicates that the microscope image properties calculated by the image evaluation model M2 do not correspond to the microscope image properties 45 calculated by the large language model LLM, feedback is provided to the large language model LLM in process P12, which is described in more detail with reference to FIG. 2.

Figure 2:
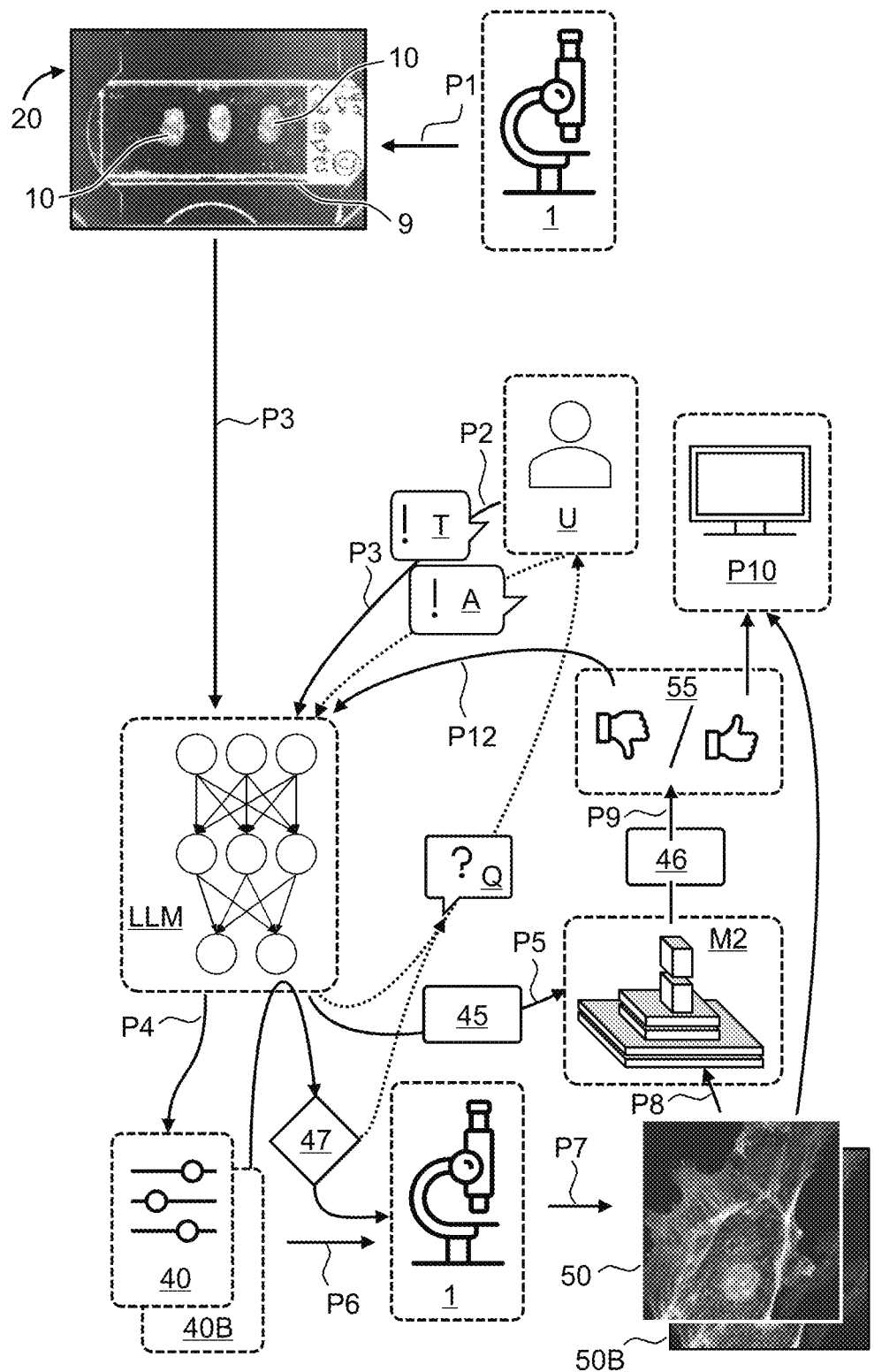
FIG. 2 schematically illustrates processes of an example embodiment of a method according to the invention.

FIG. 2: Loops of the Large Language Model with Follow-Up Queries for the User and/or Fed-Back Image Evaluations With reference to FIG. 2, additional functions of the example embodiment of FIG. 1 are first described for the case where, according to the evaluation result 55, a captured microscope image 50 does not fulfil the microscope image properties 45 required by the large language model LLM. In process P12, the evaluation result 55 or the microscope image properties 46 calculated by the image evaluation model M2 are input (by a special token) into the large language model LLM to calculate adjusted microscope settings 40B. To calculate the adjusted microscope settings 40B, the large language model LLM also takes into account the previously calculated microscope settings 40, the textual input T and the overview image 20 or analysis results ascertained from the same. The adjusted microscope settings 40B are intended to bring microscope image properties of a newly captured microscope image 50B closer to the microscope image properties 45 derived from the textual input T. The newly captured microscope image 50B is then used as described in the foregoing with reference to the microscope image 50. If necessary, the loop for adjusting the microscope settings and capturing a new microscope image can be repeated until a captured microscope image fulfils the required microscope image properties 45.

If adjusted microscope settings 40B are ascertained for the capture of the new microscope image 50B, an evaluation 47 can optionally occur. The evaluation 47 indicates whether, in light of an effect on the sample 10 or on a measurement duration that results from the adjusted microscope settings 40B, a follow-up query Q should be submitted to the user U to authorize the capture of the new microscope image 50B. For example, the required microscope image properties 45 can indicate that a particular cell type should be visible, while the evaluation result 55 indicates that this cell type is barely visible in the microscope image 50; the large language model LLM hereupon calculates adjusted microscope settings 40B with an increased illumination intensity and/or a modified illumination wavelength. It is determined in the evaluation 47 that the modified illumination can cause a bleaching of the sample 10 so that a follow-up query Q should be submitted to the user. The evaluation 47 can be calculated by the large language model LLM, which also uses all previous inputs and outputs of the large language model LLM that relate to this experiment in order to calculate the evaluation 47. A response A from the user U to the follow-up query Q is processed by the large language model LLM in order to either use the adjusted microscope settings 40B to capture the new microscope image 50B, or to modify the adjusted microscope settings 40B again based on the response A from the user U. For example, if the user responds that a photodamaging of the sample 10 is unacceptable, the large language model LLM can (potentially after a further follow-up query Q and associated response A) increase the illumination duration and measurement duration in order to thereby achieve a better visibility of the particular cell type without increasing the illumination intensity. Alternatively, the large language model LLM can switch to an objective with a higher magnification and capture a plurality of laterally offset microscope images that are stitched together to form one image (image stitching), which can also achieve a better visibility of the particular cell type without increasing the illumination intensity.

If the feedback loop has been run through several times via process P12 and an evaluation result 55 of a sufficiently good quality is still not achieved, the large language model LLM can provide feedback to the user U. In particular, the large language model LLM can use a follow-up query Q to request a change in the imaging conditions specified by the user U, e.g. to ask whether the laser power limit can be raised.

The large language model LLM is also designed to ascertain, after receiving the overview image 20 and the textual input T, whether the available information is sufficient to calculate all necessary microscope settings 40 for the capture of a desired microscope image, or whether further information is required from the user U for this purpose. If further information is required, a follow-up query Q is first submitted to the user U. The large language model LLM then uses a further textual input (response A) received from the user U together with the previously provided information to calculate the microscope settings 40. The loop of follow-up query Q and response A can be repeated until the large language model M has ascertained all necessary microscope settings 40. Only then are the microscope settings 40 used for an imaging.

Whenever possible, the large language model M formulates follow-up queries so as to ask for properties of the sample or permitted/prohibited effects on the sample, but not for specific values of the microscope settings 40. For example, the large language model M can be designed so as not to ask for a fluorescence excitation wavelength that is to be used as one of the microscope settings 40, but for an associated fluorophore/fluorochrome used. This requires less expertise from the user U and reduces a susceptibility to error. If the large language model LLM knows which dyes are being used (e.g. by automatically reading a label on the sample carrier identified in the overview image 20), the large language model LLM can also ask about sample structures of interest in a follow-up query Q and set a fluorescence excitation and detection accordingly; the user U does not need to be asked, however, about the specific settings of the fluorescence measurement.

Figure 3:
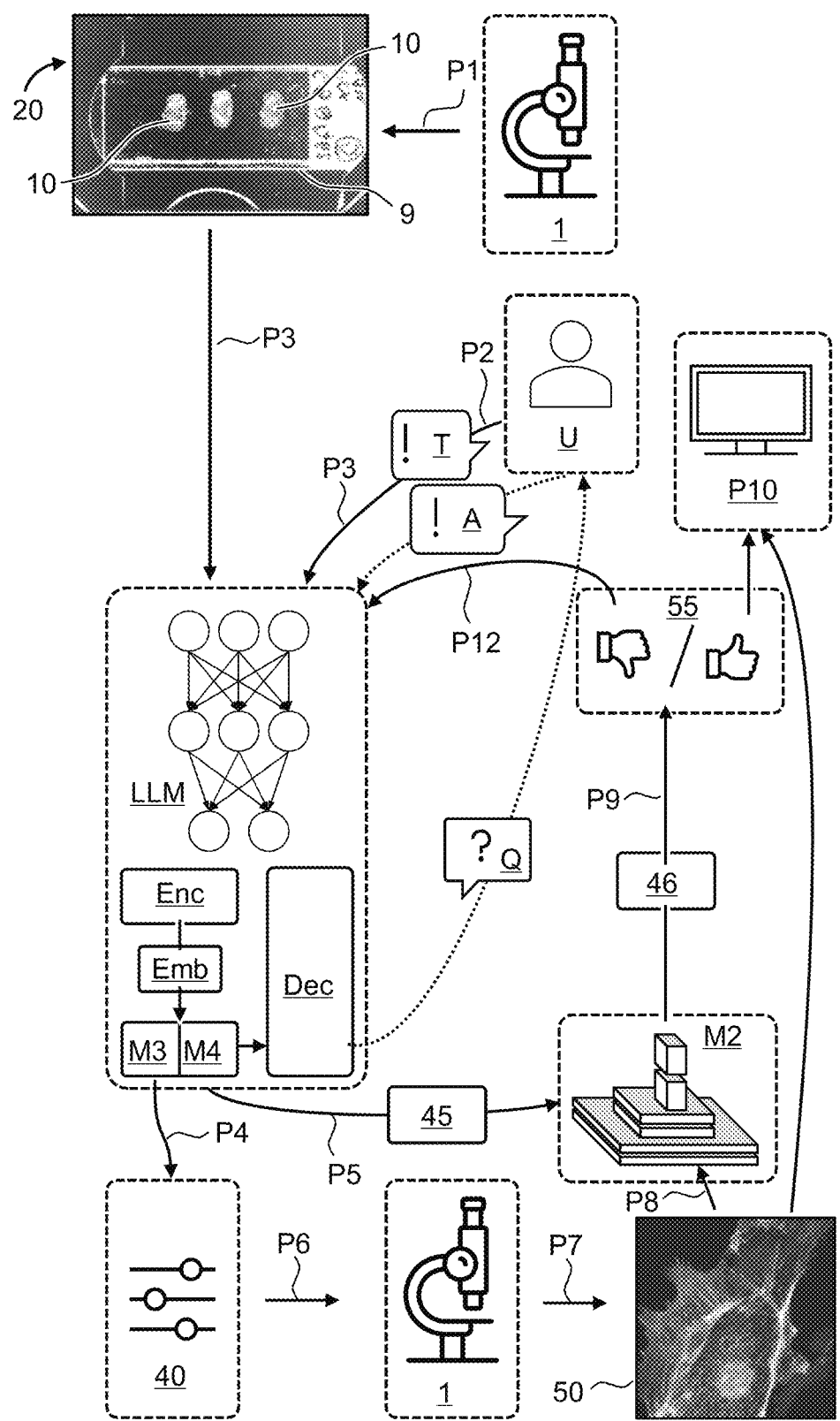
FIG. 3 schematically illustrates processes of an example embodiment of a method according to the invention.

FIG. 3: Large Language Model with Separate Decoder and Encoder

The large language model LLM can comprise a transformer decoder Dec and a transformer encoder Enc, which respectively receive the inputs into the large language model LLM or information derived therefrom, in particular the textual input T and the overview image 20 or information ascertained from the overview image 20.

The transformer encoder Enc calculates an embedding Emb from the input data. The embedding Emb can represent a feature extraction of the data input into the large language model LLM. A machine-learned classifier M4 is trained to calculate from the embedding Emb whether (or what) information is needed to determine all necessary microscope settings 40. The transformer encoder Enc and classifier M4 can also be collectively referred to as a transformer encoder model.

The transformer decoder Dec is a language model and is used to create follow-up queries Q for the user U. To this end, the decoder Dec receives a classification result of the classifier M4 as well as inputs into the large language model LLM, in particular the textual input T, optional contextual information and the overview image 20 or information obtained from the overview image 20. Using the responses A to follow-up queries Q, the transformer encoder Enc again calculates an embedding Emb. If the classifier M4 indicates that there is now sufficient information to determine all required microscope settings 40, a mapping program M3 calculates a mapping of the embedding Emb to microscope settings 40. The mapping program M3 can be a machine-learned network, wherein the mapping program M3 and the classifier M4 can optionally be formed by a common neural network. In this case, a classification result can depend on a respective confidence for each determined microscope setting 40.

In variants of the illustrated embodiment, the transformer decoder Dec can be designed to submit the follow-up queries Q to the user U without classification results of a classifier M4.

It can also be provided that the transformer decoder Dec first communicates with the user U in order to obtain all necessary information, and only then is the mapping program M3 (or the transformer encoder Enc and the mapping program M3) used to calculate a translation or regression into microscope settings 40.

Figure 4:
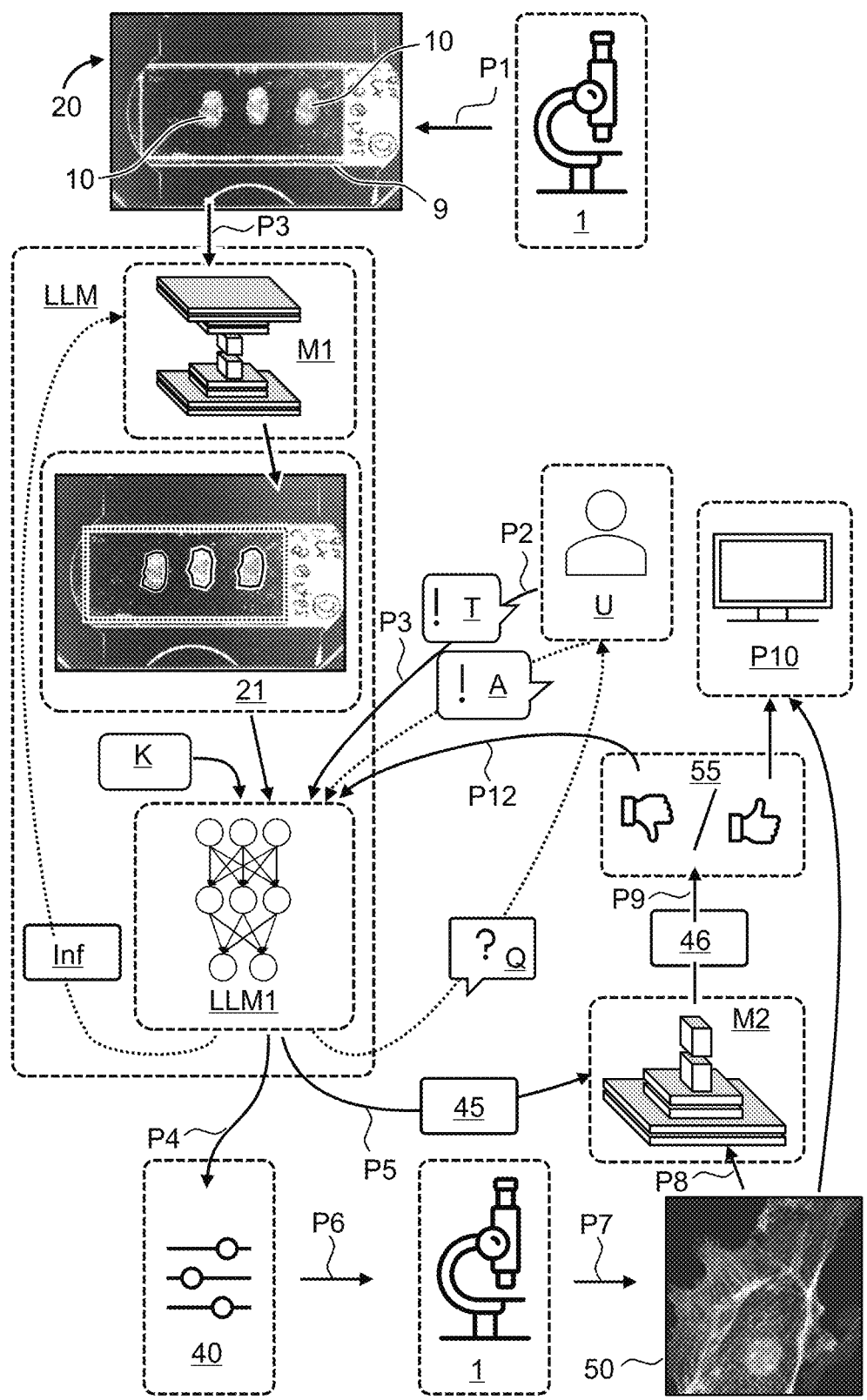
FIG. 4 schematically illustrates processes of an example embodiment of a method according to the invention.

FIG. 4: Image Analysis with the Large Language Model

Variants of the image analysis and image processing with the large language model LLM are described with reference to FIG. 4. Moreover, FIG. 4 schematically illustrates processes of a computer-implemented method according to the invention for controlling a microscope 1, wherein in particular the processes described in relation to the preceding figures can be implemented.

The large language model LLM can comprise an image analysis model M1, which receives and processes an input overview image 20. Analysis results 21 calculated by the image analysis model M1 are further processed together with the textual input T (or information derived therefrom) by a language model/machine-learned network LLM1. The outputs of the machine-learned network LLM1 correspond to those of the large language model LLM of the previous figures, and the machine-learned network LLM1 can comprise a transformer encoder and/or transformer decoder as described in relation to the previous figures.

The analysis results 21 can be an image, at least one segmentation mask or information regarding image content. For example, different object types can be identified and optionally output with associated image coordinates. Object properties such as a degree of contamination, a homogeneity of a staining process, a possible germ infestation or a fill level in a sample container can also be evaluated. The image analysis model M1 can be based on a convolutional network (CNN) with, e.g., a U-Net architecture or on a transformer, e.g. a vision transformer, as mentioned in the introduction with reference to the prior art. Optionally, the image analysis model M1 can be designed to use information Inf from the textual input T, contextual information K and information from responses A of the user U to follow-up queries Q of the machine-learned network LLM1. The information Inf is calculated by the machine-learned network LLM1 and can indicate, e.g., a sample type, a sample carrier type or a sample preparation (e.g., a staining process). This information Inf is utilized by the image analysis model M1 in the image analysis. For example, different segmentation models or detection models can be provided and one of these models can be used as a function of the sample type.

The analysis results 21 output by the image analysis model M1 can be generated in text form, which makes it possible for the machine-learned network LLM1 to process the same together with the textual information T. In particular, pre-trained language models can be used for the machine-learned network LLM1 in this case, without extensive adjustments being necessary to take into account the analysis results 21. If necessary, the pre-trained language model can be adjusted with a fine-tuning for the determination of the microscope settings. In order to display the analysis results 21 in text form, an equivalent textual specification of the segmented object type can be used together with a specification of the associated image coordinates, for example, instead of a segmentation mask.

Alternatively, it is also possible for the overview image 20 to be encoded/mapped in a feature space by, e.g., a vision transformer; the encoding of the overview image 20 is then combined with the textual input T (or with a result of further processing of the textual input T by a language model) and conjointly processed by a machine-learned model. In this case, the encoding of the overview image 20 can essentially retain the entire information content of the overview image 20 so that more comprehensive image analysis results are possible.

Figure 5:
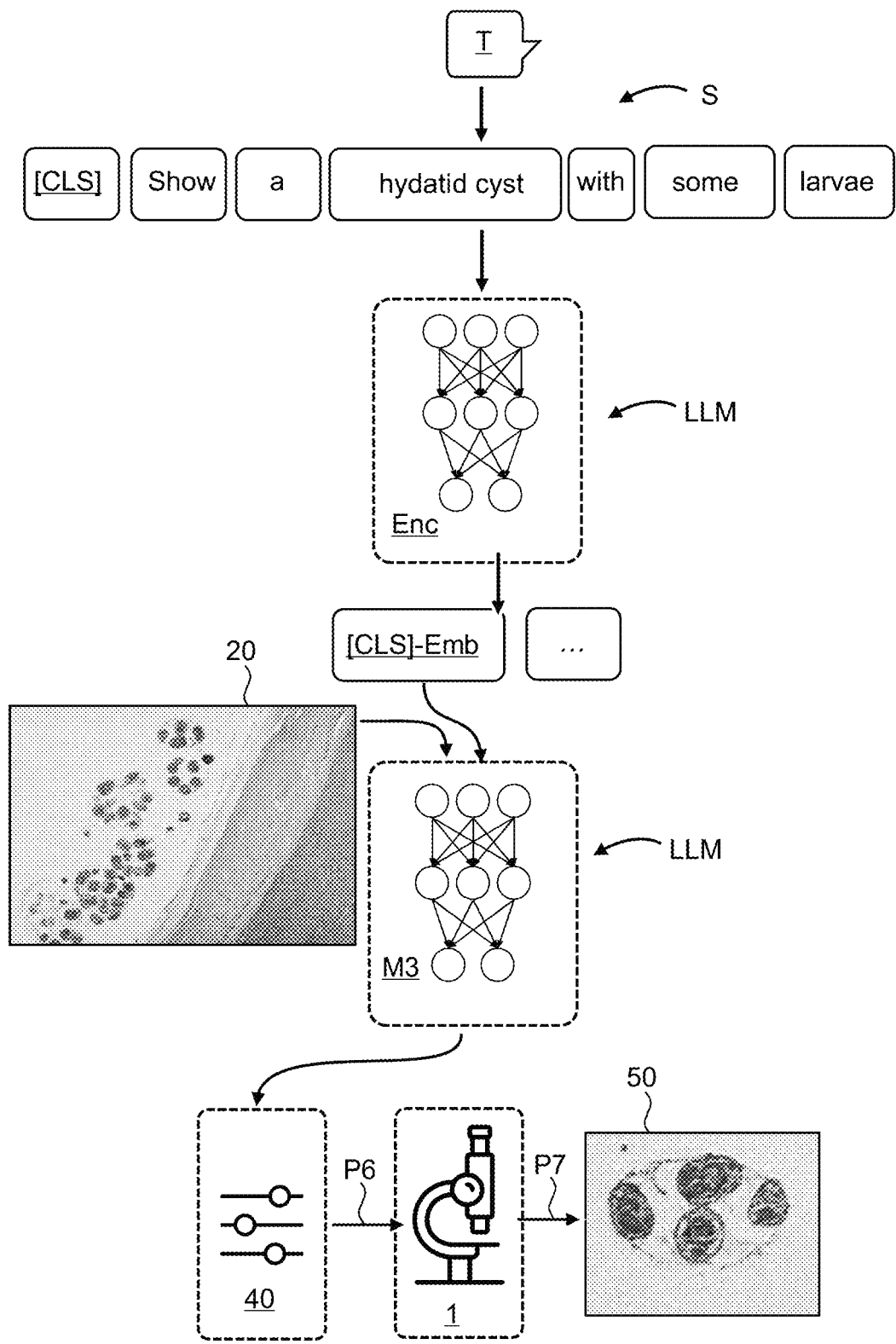
FIG. 5 schematically illustrates processes of an example embodiment of a method according to the invention.

FIG. 5: Large Language Model with Transformer Encoder

FIG. 5 schematically illustrates processes of an example embodiment of a method according to the invention, wherein the large language model LLM comprises a transformer encoder Enc for at least one processing of the textual input T. Other textual information—e.g., user responses, contextual information or textual image analysis results—can be processed together with the textual input T in the form of a combined text.

The textual input T is converted into a sequence S of tokens, wherein in this example each token is a word of the textual input T "Show a hydatid cyst with some larvae". Other divisions into tokens are possible. The sequence S is preceded by a start token [CLS], the values of which were defined by a training of the transformer encoder Enc. The sequence S with the start token [CLS] is input into the transformer encoder Enc. The transformer encoder Enc calculates therefrom an output, which contains a representation (hidden state representation) [CLS]-Emb of the start token [CLS]. In particular, an associated hidden state representation can be calculated for each token. The transformer encoder Enc can comprise in a known manner a plurality of self-attention blocks for this purpose, which respectively calculate Q, K and V vectors for the tokens. The output of a block for the start token [CLS] is calculated by applying the Q vector of the start token [CLS] in a calculation with the K and V vectors of every other token, as described in the introduction with reference to the prior art. This output forms the input into the next self-attention block. The self-attention mechanism can be implemented a number of times in parallel in order to provide a multi-head attention.

The hidden state representation [CLS]-Emb of the start token [CLS] contains information of the entire sequence S, which is why only the hidden state representation [CLS]-Emb is used as an aggregated sequence representation for the further processing by the large language model LLM, without the remaining hidden state representations of other tokens.

The hidden state representation [CLS]-Emb is input into a mapping program M3, which is designed to calculate a mapping to values of the microscope settings 40. The mapping program M3 can be learned through a supervised training, in which associated microscope settings 40 are specified as ground truth data for different values (=positions in the feature space) of a hidden state representation [CLS]-Emb. The values of the hidden state representations [CLS]-Emb of the training data can be calculated from given sequences S by means of the ready-trained transformer encoder Enc.

Depending on the design of the large language model LLM, an overview image 20 is taken into account at different points, in particular by the transformer encoder Enc and/or by the mapping program M3. In the illustrated example, the hidden state representation [CLS]-Emb for a textual input T is input into the mapping program M3 together with the overview image 20. More generally, a preprocessing of the overview image 20 is also possible, so that a processing result for the overview image 20 is input into the mapping program M3 instead of the overview image 20. The preprocessing can occur, e.g., using a machine-learned feature extractor.

The textual input T contains information regarding a desired microscope image and in this case regarding an employed sample, namely the specification of the sample type (hydatid cyst) and information regarding the magnification of the desired microscope image derived from the specification that a hydatid cyst with larvae is to be displayed, as opposed to, e.g., a plurality of separate cysts, a single larva or only a particular cell type within a larva.

Using the textual input T, the large language model LLM can thus derive information regarding the object size (a hydatid cyst) and thus determine a corresponding optical magnification to be set, e.g. an objective selection and/or a zoom setting, so that exactly one hydatid cyst is visible in a microscope image to be captured. In this example, the overview image 20 shows approximately six hydatid cysts, i.e. bubbles filled with a fluid, each containing several tapeworm larvae. Through the hidden state representation [CLS]-Emb, the mapping program M3 knows which object type should occur in the overview image 20, so that a segmentation or object-position determination can be carried out specifically for this object type (or for objects with a given size known to be characteristic of this object type). The large language model LLM thus uses the overview image 20 to derive coordinates of an object that is to be analyzed according to the textual input T.

In order for a segmentation or object-position determination to function in a manner that is as error-free as possible, it is generally necessary for the size of the depicted objects in pixels to correspond to an object size in pixels used in the training. Depending on the resolution of the overview image, this is often not the case or would place excessive demands on the scope of training data. The large language model LLM, however, is able to estimate, based on the knowledge of the object type (the usual actual object size for this object type being known to the large language model LLM) and based on the knowledge of the imaging conditions of the overview image 20, how many pixels objects of the object type (here the object types hydatid cysts and larvae) should typically occupy in the overview image 20. The overview image 20 can then be scaled up or down in order to bring the estimated pixel size in line with an average pixel size of objects that was used in the training. The rescaled overview image can then be further processed to ascertain, inter alia, coordinates of the desired objects.

The object coordinates, the objective selection and/or a zoom setting and other settings are output by the mapping program M3 as microscope settings 40. In process P6, the microscope 1 is controlled with these microscope settings 40 in order to capture a microscope image 50 in process P7. The microscope image 50 corresponds in its microscope image properties to requirements derived from the textual input T. The microscope image 50 can be used further as described in relation to the previous figures.

The descriptions relating to FIG. 5 are not intended to be understood as exhaustive. For example, the sequence S can be supplemented with further content consisting of in particular contextual information, a token "end of sentence" can be added, and a positional encoding of the tokens is possible.

Figure 6:
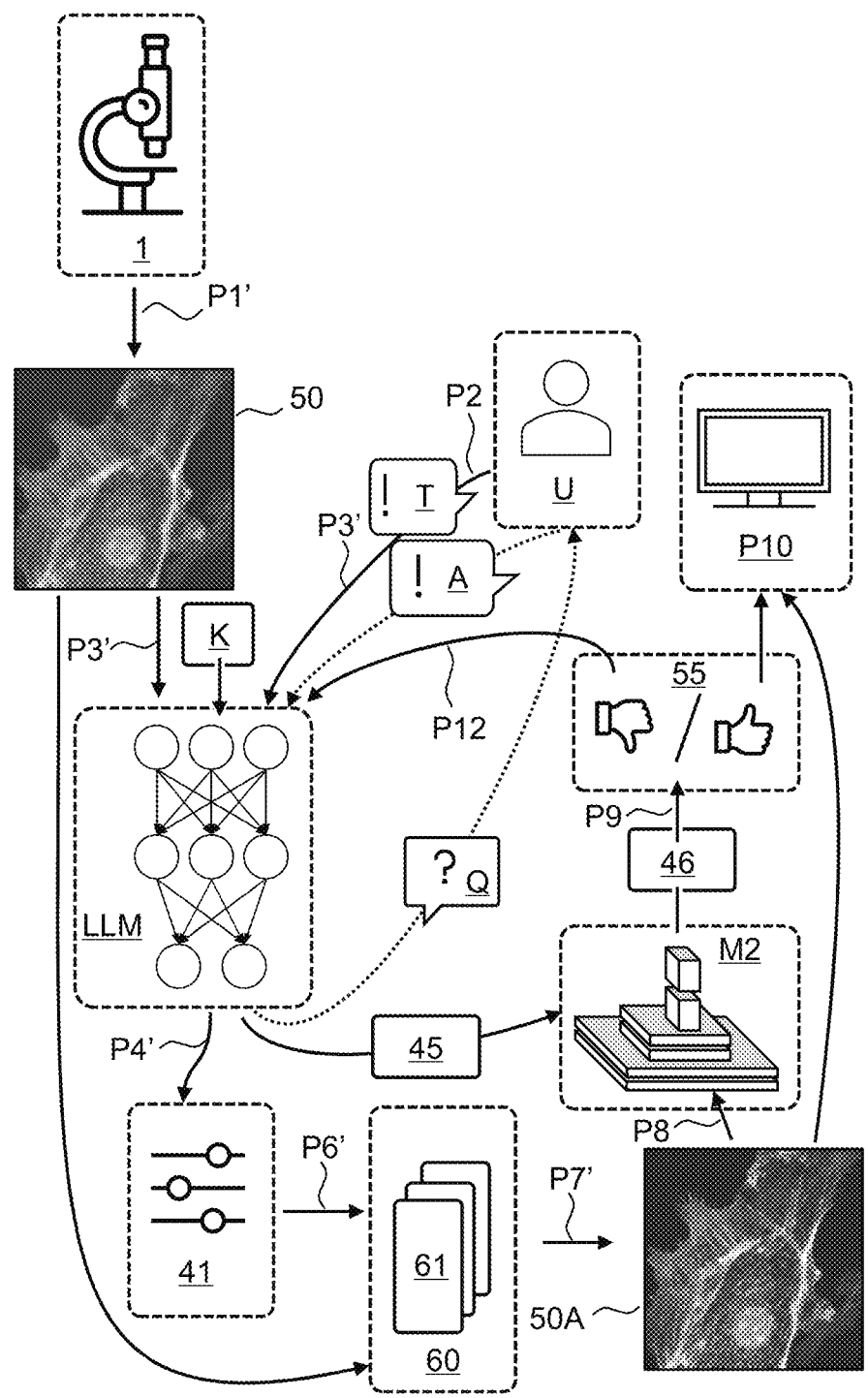
FIG. 6 schematically illustrates processes of an example embodiment of a method according to the invention.

FIG. 6: Method for Image Processing

FIG. 6 schematically illustrates processes of an example embodiment of a method according to the invention for processing a microscope image. The illustrated processes can optionally be used in combination with the processes of one or more of the other example embodiments.

In process P1', at least one microscope image 50 of a sample is received, e.g. captured by a microscope 1 or loaded from a memory. In addition, in process P2, a textual input T of a user U is received, which describes a desired image processing.

The textual input T and the microscope image 50 are input into a large language model LLM in process P3'. This is a machine-learned neural network which calculates processing parameters 41 for processing the microscope image 50 from the textual input T and the microscope image 50 in process P4'. The processing parameters 41 are used in process P6' to select at least one image processing program 60 to be used from among a plurality of provided image processing programs. Parameters of the employed image processing program 60 are also defined by the processing parameters 41. Then, in process P7', the microscope image 50 is processed using the calculated processing parameters 41, i.e. it is processed by the selected image processing program 60 with the set parameters. In the illustrated example, the image processing program 60 calculates a processed microscope image 50A.

The image processing programs 60 can comprise, e.g., different programs for image sharpening, different programs for denoising, for resolution enhancement, for suppressing artefacts and/or for virtually staining different object types. The different programs for the same task can be used, e.g., to process different object types.

In the illustrated example, the textual input T indicates that an image sharpening of a microscope image 50 should be carried out. The large language model LLM learns from contextual information K relating to the microscope image 50 what types of biological cells are depicted. The large language model LLM evaluates the microscope image 50 with regard to a contrast type, wherein it is determined in this example that multiple fluorescence channels were used in the imaging (as opposed to, e.g., a phase-contrast or DIC image). The large language model LLM also ascertains which object types (e.g. which cell type or cell organelle type) are present in which image regions. To this end, segmentation or position determination models are selected which are sensitive to the cell types that occur according to contextual information K. The large language model LLM indicates as a processing parameter 41 which of a plurality of provided image sharpening programs 61 are to be used. Properties of the microscope image 50 (e.g. contrast type, determined SNR) and of occurring object types are mapped to one or more provided image sharpening programs 61 to be used. It is optionally possible for different image processing programs to be used for different objects localized in the microscope image 50. In this example, different image regions are defined according to localized different cell types; the different image regions are then processed by different image sharpening programs 61 to form the processed microscope image 50A.

The processed microscope image 50A can be evaluated by an image evaluation model M2 analogously to the evaluation of microscope images already described with reference to the other figures.

The large language model LLM uses the textual input, optionally provided contextual information K and the microscope image 50 to evaluate whether it is possible to select a most suitable image processing program and define all necessary parameters, or whether a relevant uncertainty remains as to which of a plurality of possible image processing programs or parameter settings are necessary for a best possible image processing. In cases of an uncertainty, the large language model LLM checks which information regarding the employed sample, the performed imaging or an already performed image processing can be used to eliminate the uncertainty. The large language model LLM then submits a corresponding follow-up query Q to the user U. For example, it is possible that a cell type is known, but this cell type differs considerably depending on the living organism, and different image sharpening programs 61 are available for different organisms. By means of the follow-up query Q, the large language model LLM elicits the response A from the user U as to whether the sample and thus the depicted cell types originate from a human or a reptile, for example, which is incorporated in the determination of the processing parameters 41.

Figure 7:
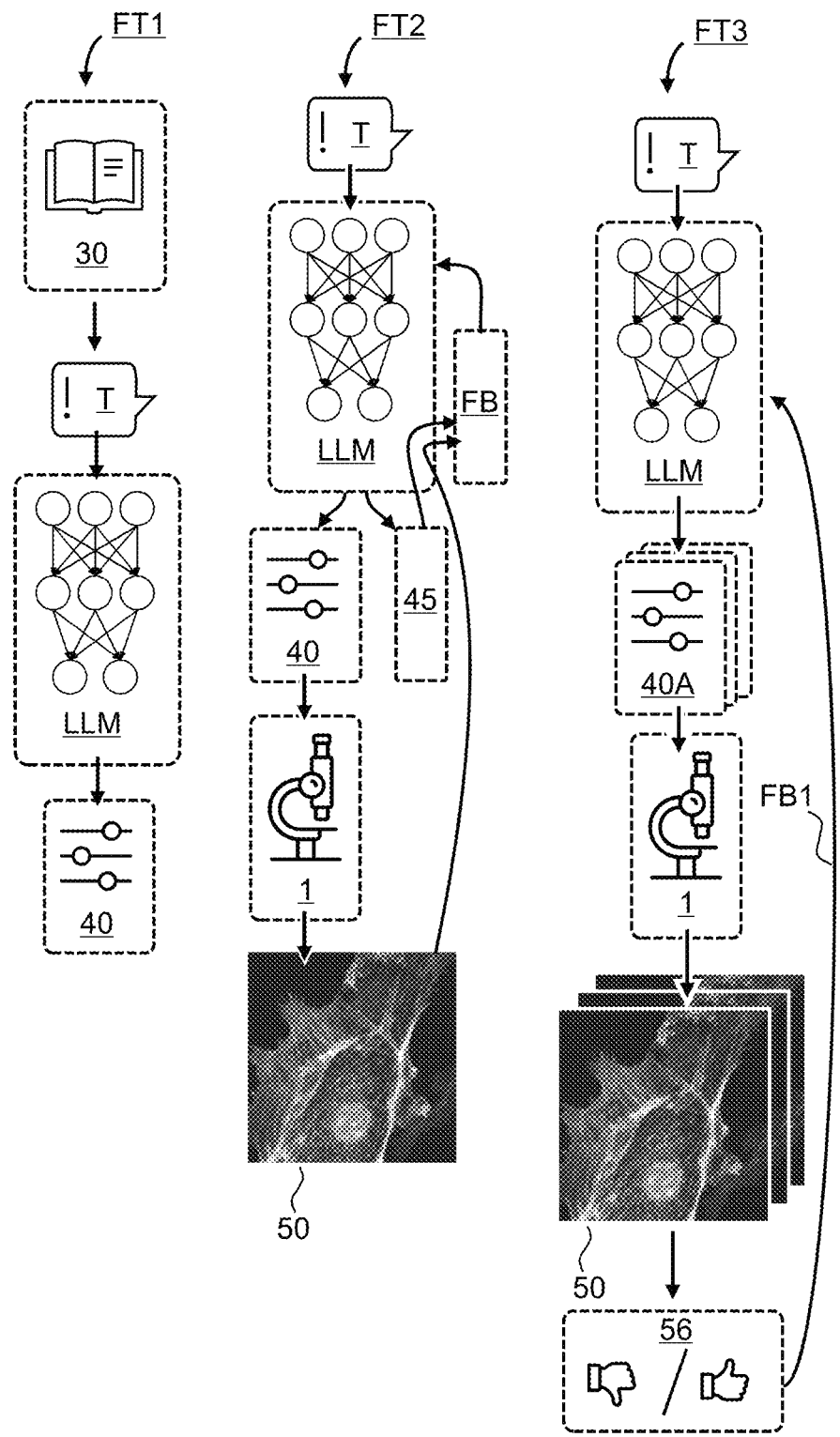
FIG. 7 schematically illustrates processes of an example embodiment of a method according to the invention.

FIG. 7: Training of the Large Language Model

FIG. 7 schematically illustrates training processes of the large language model LLM. The large language model LLM is or comprises a pre-trained language model, which is, e.g., transformer-based and has been trained using extensive text databases (pre-training).

The language model is adjusted to the given task in a follow-up training (fine-tuning), wherein three different fine-tuning processes are illustrated in the figure, which can be carried out alternatively or cumulatively, in particular in the illustrated order.

In a follow-up training (fine-tuning FT1) of the large language model LLM, training data 30 is used which comprises microscope user manuals, chats between microscope users and microscope service staff and programming-language-based files of microscope settings, e.g. in XML format. The large language model LLM is thereby trained to calculate microscope settings 40 for a textual input T and/or to ask follow-up queries. The specific use of the training data 30 in the fine-tuning FT1 depends on the structure of the large language model LLM. For example, with a structure in the form of a transformer decoder, a chat history of the training data can be replicated. With a transformer encoder-decoder, it is possible to use, for example, a translation of a provided pair of an experiment description and an associated (in particular programming-language-based) specification of microscope settings, wherein the experiment description is processed in the encoder and the microscope settings are predicted by the decoder.

The figure also shows schematically the processes of a fine-tuning FT2 of the large language model LLM, which can optionally be carried out after the fine-tuning FT1. In the fine-tuning FT2, a textual input T, which can be loaded from a database or generated by the large language model LLM, is input into the large language model LLM. The large language model LLM uses the textual input T to calculate microscope settings 40 and desired microscope image properties 45 that a microscope image to be captured should fulfil. The microscope settings 40 are used to control a microscope 1 to capture a microscope image 50. The microscope image 50 and the desired microscope image properties 45 are then input into the large language model LLM (or a dedicated image evaluation model) to evaluate whether the microscope image 50 fulfils the desired microscope image properties 45. A corresponding evaluation is used as feedback FB for adjusting the model parameter values of the large language model. For example, a textual input T can indicate that an image with a clearly visible nucleus of a cell of a particular type should be captured. One of the desired microscope image properties 45 is a clearly visible cell nucleus. If the evaluation of the microscope image 50 yields that no cell nucleus, only a section of a cell nucleus or only a poorly visible cell nucleus is contained in the microscope image 50, a corresponding feedback FB can be returned by means of which, e.g., the illumination wavelength and/or detection wavelength or the illumination intensity is adjusted, or, in the case of a cell nucleus that is only captured in sections, modified microscope settings for a lateral translation of the sample are performed.

Similarly, a rule-based reward model can be used in which the microscope settings are evaluated by the large language model without it being necessary to capture a microscope image. For example, calculated microscope settings can be evaluated according to predefined rules that define a minimum illumination intensity and/or exposure time for a sufficient SNR, optionally as a function of different sample types and other microscope settings. For example, microscope settings 40 can have been calculated by the large language model LLM in response to a textual input T according to which a sample-preserving analysis is to be carried out, which would lead to an insufficient SNR, in which case there is no reinforcement of the associated parameter decision.

The figure also shows processes of a fine-tuning FT3 of the large language model LLM, which can be carried out instead of or in addition to (in particular after) the fine-tuning FT2. The fine-tuning FT3 uses an RLHF (reinforcement learning from human feedback). For a textual input T, the large language model LLM computes a plurality of candidate microscope settings 40A, which are respectively used to capture a microscope image 50. A person provides an evaluation 56 of the microscope images 50, e.g., which of the microscope images 50 implements the textual input T best. A feedback FB1 reinforces the parameter decision according to which the candidate microscope setting 40A leads to the microscope image 50 with the best evaluation. User feedback can also be gathered during the normal operation of the microscope and subsequently used for a fine-tuning.

Figure 8:
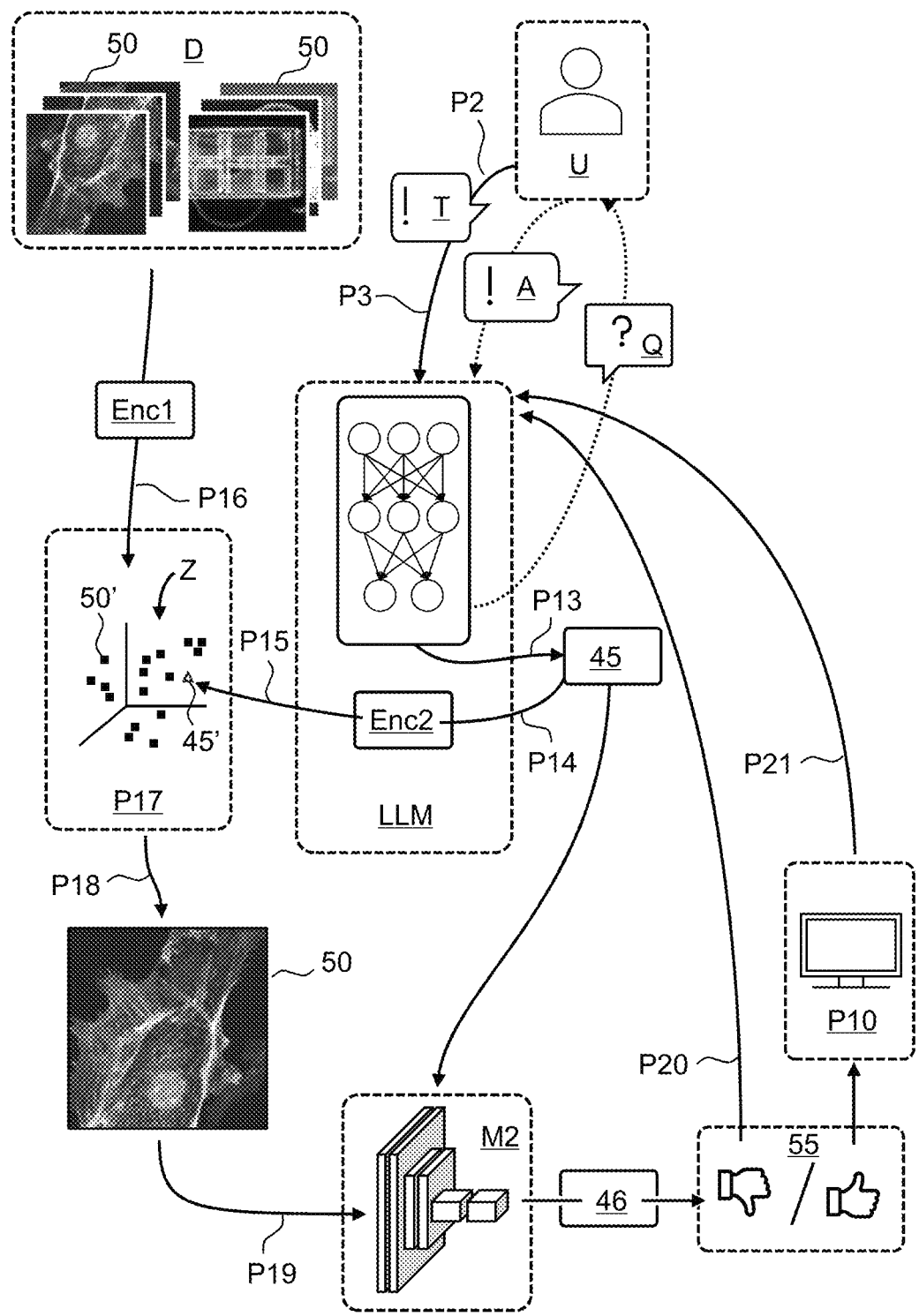
FIG. 8 schematically illustrates processes of an example embodiment of a method according to the invention.

FIG. 8: Image Retrieval

In FIG. 8, processes of a method according to the invention for retrieving a desired microscope image are illustrated schematically. A suitable microscope image 50 is selected from a database D according to a user request by means of a large language model LLM. The processes described in the following can optionally be carried out in addition to the processes of the other example embodiments.

In process P2, a textual input T of a user U that describes a desired microscope image is received. The desired microscope image can be described in the textual input T as described in relation to the preceding figures. In particular, it can be described which sample type and which sample stage should be visible in a microscope image.

The textual input T is input into the large language model LLM, which calculates desired microscope image properties 45 from the textual input T in process P13. In terms of content, the microscope image properties 45 can correspond to the specifications of the textual input T, but can also comprise specifications derived from the latter. For example, it is possible to infer, as a function of the desired object type, a sample preparation suitable for this object type or a suitable measurement method, so that a microscope image to be selected should have been captured with this suitable measurement method. For example, if according to the textual input T cell nuclei should be clearly visible, it can be determined as a microscope image property 45 that an image of a sample with a DAPI stain (or another stain that binds to DNA) should be selected, or an image for which an excitation wavelength typical for this stain was used in the imaging.

In process P14, the desired microscope image properties 45 are input into a transformer encoder Enc2, which calculates a mapping 45' of the microscope image properties 45 into a feature space Z/latent space.

A database D comprises a plurality of microscope images 50, for example tens of thousands or hundreds of thousands of images, for which a respective mapping (feature space representation 50') into the feature space Z is available. The feature space representations 50' were calculated in advance in process P16 using an encoder Enc1. The encoder Enc1 can be, for example, a transformer encoder or another learned model. Alternatively, the encoder Enc1 can also calculate an embedding of the microscope images 50 by means of a stochastic neighbour embedding (SNE), in particular by means of a t-distributed stochastic neighbour embedding (t-SNE), as described in greater detail by the Applicant in the German patent application DE 10 2022 121 545 of 25 Aug. 2022. This embedding creates a feature space in which a distance between the embeddings of two microscope images reflects their similarity. The embeddings of the microscope images 50 can be used together with associated microscope image properties as training data in a training of the encoder Enc2, so that the encoder Enc2 learns a mapping from a set of (textual) microscope image properties to a point in the feature space Z.

In process P17, it is ascertained which of the feature space representations 50' is closest to the representation 45' of the microscope image features 45 in the feature space Z. The associated microscope image 50 is loaded from the database D in process P18.

In the illustrated example, an optional evaluation or verification of the loaded microscope image 50 is carried out, to which end it is input into an image evaluation model M2 in process P19. The image evaluation model M2 evaluates for one or more of the desired microscope image properties 45 whether these are fulfilled in the selected microscope image 50. To this end, the image evaluation model M2 calculates corresponding microscope image properties 46 of the selected microscope image 50. Which microscope image properties are ascertained is not fixed but determined by the desired microscope image properties 45. For example, if the desired microscope image properties 45 specify a particular contrast type, which contrast type is present or whether the desired contrast type is present is ascertained as a microscope image property 46. If the desired microscope image properties 45 specify a sample type, a classification of the sample type depicted in the selected microscope image 50 is carried out instead or as well.

If an evaluation result 55 of the image evaluation model M2 indicates that the microscope image properties 46 do not sufficiently match the desired microscope image properties 45, a corresponding feedback is provided to the large language model LLM in process P20. The large language model LLM, in particular the transformer encoder Enc2, calculates a new mapping 45' of desired microscope image properties 45 into the feature space Z while taking into account the feedback, for example by adding as a desired microscope image property via the feedback that an undesired microscope image property 46 of the previously selected microscope image 50 should not be present. A new microscope image is selected and evaluated using the new representation.

If an evaluation result 55 of the image evaluation model M2 yields that the selected microscope image 50 fulfils the desired microscope image properties, it is displayed to the user U in process P10. If the user U is not satisfied with the selected microscope image 50, he or she can supplement the previous textual input T in process P21, for example by describing desired differences to the selected microscope image 50. The described cycle is repeated with the supplemented textual input T in order to select a new microscope image and display it to the user U.

The large language model LLM can also submit follow-up queries Q to the user U in order to also utilize elicited user responses A to determine desired microscope image properties 45. A follow-up query Q can be issued, e.g., when the large language model LLM categorizes the textual input T as ambiguous or potentially misleading. The large language model LLM can determine how large a distance is between different feature space representations 50' whose associated microscope images 50 fulfil the microscope image properties 45. If the distance exceeds a predefined value, the large language model LLM can infer that the textual input T is too unspecific so that extremely different microscope images 50 comply with this request. For the distribution of the feature space representations 50' whose associated microscope images 50 comply with the request, one or more main axes in the feature space Z can be ascertained, i.e. the directions of the greatest distances. The large language model LLM also ascertains which microscope image properties make the greatest contribution to these main axes. A follow-up query Q is then issued with regard to these ascertained microscope image properties. This way, the required microscope image properties 45 can be determined by means of a few follow-up queries Q in order to select a microscope image that is likely to be suitable.

FIG. 9: Microscope

Figure 9:
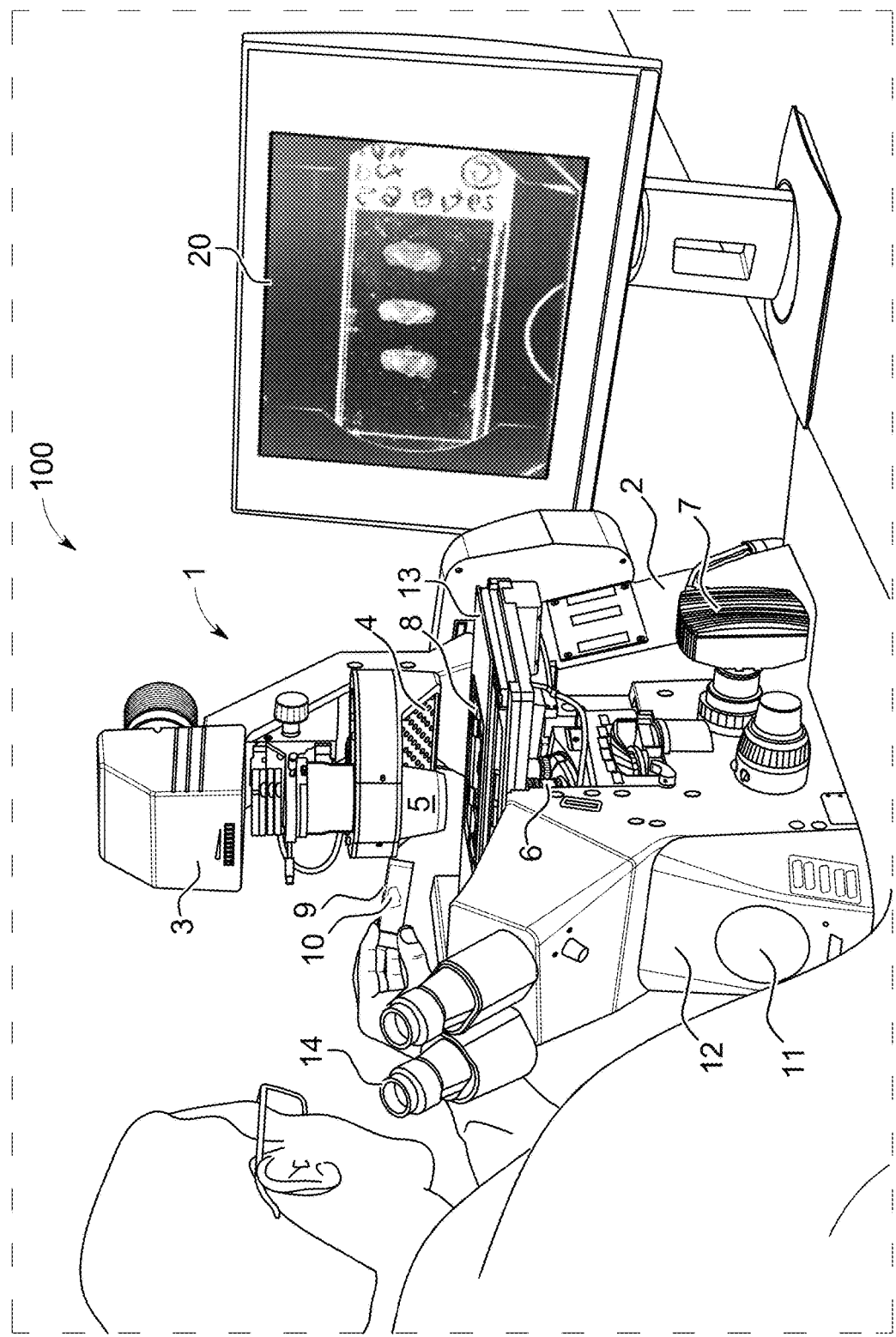
FIG. 9 schematically illustrates an example embodiment of a microscope according to the invention.

FIG. 9 shows an example embodiment of a microscopy system 100 according to the invention. The microscopy system 100 comprises a microscope 1 and a computing device 12 which can form part of the microscope 1 or which can be separate from the microscope 1. The microscope 1 comprises a stand 2 via which further microscope components are supported. The latter can in particular include: an illumination device 3; a condenser 5 for guiding illumination light to the sample area; an objective changer/revolver, on which an objective 6 is mounted in the illustrated example; a sample stage 13 with a holding frame 8 for holding a sample carrier 9; and a microscope camera 7. When the objective 6 is pivoted into the light path of the microscope, the microscope camera 7 receives detection light from a sample area in which a sample can be located in order to capture a sample image. In principle, a sample 10 can be or comprise any object, fluid or structure. To capture an overview image 20 of a sample environment, the microscope 1 can use an objective with a lower magnification and/or an optional additional overview camera (not illustrated), which views the sample area vertically or at an oblique angle. For the capture of an overview image, an illumination can be used which comprises, e.g., a plurality of LEDs 4 whose direction of illumination for a dark-field measurement is oriented at an oblique angle in relation to a detection axis. In addition to the microscope camera 7, it is also possible to view a sample via an eyepiece 14. The microscopy system 100 also comprises a computer program 11, which is only illustrated schematically, which is stored on a non-volatile storage medium. The computer program 11 or the computing device 12 are configured to carry out the method variants described with reference to the other figures. The microscope 1 is a light microscope in the illustrated example, but can in principle also be another type of microscope.

The variants described with reference to the different figures can be combined with one another. The described example embodiments are purely illustrative and variants of the same are possible within the scope of the attached claims.

| List of reference signs | |
|---|---|
| 1 | Microscope |
| 2 | Stand |
| 3 | Illumination |
| 4 | LEDs |
| 5 | Condenser |
| 6 | Objective |
| 7 | Microscope/system camera |
| 8 | Holding frame for holding a sample carrier |
| 9 | Sample carrier |
| 10 | Sample |
| 11 | Computer program |
| 12 | Computing device |
| 13 | Sample stage |

-continued

| | List of reference signs |
|---|---|
| 14 | Eyepiece |
| 20 | Overview image |
| 21 | Analysis results |
| 30 | Training data |
| 40 | Microscope settings |
| 40A | Candidate microscope settings in the training of the large language model |
| 40B | Adjusted microscope settings |
| 41 | Processing parameters |
| 45 | Microscope image properties to be fulfilled that are derived from a textual input |
| 45' | Mapping of desired microscope image properties into the feature space Z |
| 46 | Microscope image properties of the captured microscope image 50 |
| 50, 50B | Microscope image |
| 50A | Processed microscope image |
| 50' | Feature space representations of microscope images |
| 55 | Evaluation result of the image evaluation model |
| 56 | Evaluation of the microscope images |
| 60 | Image processing program |
| 61 | Image sharpening program |
| 100 | Microscopy system |
| A | User response |
| [CLS] | Start token |
| [CLS]-Emb | Hidden state representation of the start token |
| D | Database |
| Dec | Transformer decoder of the large language model |
| Enc, Enc1, Enc2 | (Transformer) Encoder |
| Emb | Embedding of received input data calculated by the encoder Enc |
| FB, FB1 | Feedback in the training of a large language model |
| FT1-FT3 | Follow-up training (fine-tuning) of a large language model |
| Inf | Information to be taken into account in the image analysis |
| K | Contextual information |
| LLM | Large language model |
| LLM1 | Machine-learned network of the LLM |
| M1 | Image analysis model |
| M2 | Image evaluation model |
| M3 | Mapping program |
| M4 | Classifier |
| M5 | Submodel |
| P1-P21 | Processes of methods of the invention |
| P1'-P7' | Processes of methods of the invention |
| Q | Follow-up query of the large language model for a user |
| S | Sequence of tokens |
| T | Textual input |
| U | User of the microscope |
| Z | Feature space |

The invention claimed is:

1. A computer-implemented method for controlling a microscope, comprising:
receiving a textual input describing at least a desired microscope image;
receiving a first image of a sample;
inputting the textual input and the first image into a large language model, which is a machine-learned neural network trained to process the textual input and the first image together in order to calculate microscope settings for capturing a microscope image that corresponds to the desired microscope image;
capturing a microscope image with the microscope settings calculated by the large language model;
the large language model being trained to ascertain whether a follow-up query to a microscope user shall be made to ascertain at least one of the microscope settings to be set; and
in the case of a follow-up query: inputting a user response into the large language model as further textual input,
wherein the large language model comprises an encoder which is used in calculating the microscope settings from at least the textual input and from user responses received in response to follow-up queries;
wherein the textual input is converted into a sequence of tokens;
wherein a special token is added to the sequence;
wherein the encoder is used for calculating an output from the special token with the sequence, the output including a hidden state representation of at least the special token or the sequence of tokens;
wherein at least the hidden state representation is input into a mapping program configured to calculate a mapping to values of the microscope settings.

2. The method according to claim 1,
wherein the microscope settings specify the following:
a magnification;
an imaging speed;
a location of a sample region to be analyzed and a sample stage position;
an illumination power or intensity;
an illumination duration;
a focusing;

a condenser setting;
excitation wavelengths used in case of fluorescence excitation;
a number of detection channels and properties of the detection channels;
a contrast method;
a single imaging or a time-series imaging.

3. The method according to claim 1,
wherein the textual input indicates at least one of the following:
which objects should be visible in the desired microscope image;
a type of sample involved;
which dyes were employed in a sample preparation;
whether a bleaching of the sample is permitted; and
whether priority is given to an image quality or to a conservation of the sample.

4. The method according to claim 1,
wherein, in the event of a follow-up query, the large language model is trained not to ask for values of microscope settings, but to query properties of the sample, of the desired microscope image or of an experiment to be carried out that are relevant for these microscope settings.

5. The method according to claim 1,
wherein an evaluation of whether it is necessary to submit a follow-up query to the user occurs:
by means of a special coding in an output of the large language model or by means of a transformer-encoder model of the large language model, which carries out a classification regarding a necessity of follow-up queries.

6. The method according to claim 1,
wherein the large language model comprises a transformer decoder which is trained to issue the follow-up queries, and the encoder is a transformer encoder.

7. The method according to claim 6,
wherein the special token is a start token whose values were learned in a training of the transformer encoder and which is placed before the sequence.

8. The method according to claim 1,
wherein the large language model is trained to derive from the textual input microscope image properties to be fulfilled that the microscope image is to fulfil in order to comply with the textual input;
wherein a machine-learned image evaluation model calculates associated microscope image properties from the microscope image captured using the microscope settings ascertained by the large language model;
wherein, in cases where the microscope image properties of the microscope image comply with the microscope image properties to be fulfilled that are derived from the textual input, the microscope image is used; and
wherein, in cases where the microscope image properties of the microscope image do not comply with the microscope image properties to be fulfilled, feedback is provided to the large language model, which uses the feedback to ascertain adjusted microscope settings for capturing a new microscope image;
wherein the large language model, in cases where adjusted microscope settings are ascertained for capturing the new microscope image, carries out an evaluation as to whether a follow-up query should be issued to a user to authorize the capture of the new microscope image due to an effect on the sample or on a measurement duration that results from the adjusted microscope settings.

9. The method according to claim 1,
wherein the large language model contains an image analysis model which calculates analysis results from the first image, which are calculated by the large language model together with the textual input in order to determine the microscope settings;
wherein the analysis results specify one or more of the following:
a sample carrier type,
a sample type,
whether chemical dyes were used for a sample preparation and, if so, what chemical dyes were used,
a type of experiment,
one or more focus positions,
a state or degree of contamination of a sample carrier or of the sample,
locations of relevant regions, and
information content of text or of a barcode on a sample carrier.

10. The method according to claim 9,
wherein the textual input is also taken into account in a calculation of analysis results from the first image.

11. The method according to claim 1,
wherein the textual input also describes a desired image processing;
wherein the method also includes:
inputting the textual input and the microscope image into the large language model, which is trained to calculate processing parameters for processing the microscope image from the textual input and the microscope image; and
processing the microscope image using the calculated processing parameters.

12. The method according to claim 11,
wherein the textual input indicates at least one of the following:
whether the processing of the microscope image should cause a denoising, a resolution enhancement, a deconvolution, a change in a depth of field, a virtual contrast type change, a background suppression or an artefact removal.

13. The method according to claim 11,
wherein the processing parameters specify one or more of the following:
a selection of one of a plurality of deconvolution algorithms, one of a plurality of resolution enhancement algorithms, or one of a plurality of denoising algorithms;
a number of iterations to be performed or a regularization term for a deconvolution algorithm, a resolution enhancement algorithm or a denoising algorithm.

14. The method according to claim 1,
where the textual input is created by a user via voice input with a subsequent speech-to-text processing or via an input device or a graphical interface.

15. The method according to claim 1,
wherein the large language model is formed by a fine-tuning of an existing large language model, and wherein training data for the fine-tuning includes one or more of the following:
microscope user manuals;
chats between microscope users and microscope service staff;
records of training sessions on microscopes.

16. A microscopy system including
a microscope for imaging; and
a computing device configured to carry out the computer-implemented method according to claim 1.

17. A non-volatile data storage medium storing a computer program comprising instructions which, when the program is executed by a computer, cause the computer to execute the method according to claim 1.

18. The method according to claim 1,
wherein the first image is an overview image.

19. A computer-implemented method for controlling a microscope, comprising:
receiving a textual input describing at least a desired microscope image;
receiving a first image of a sample;
inputting the textual input and the first image into a large language model, which is a machine-learned neural network trained to process the textual input and the first image together in order to calculate microscope settings for capturing a microscope image that corresponds to the desired microscope image;
capturing a microscope image with the microscope settings calculated by the large language model;
the large language model being trained to ascertain whether a follow-up query to a microscope user shall be made to ascertain at least one of the microscope settings to be set; and
in the case of a follow-up query: inputting a user response into the large language model as further textual input;
wherein the large language model is trained to derive from at least the textual input microscope image properties to be fulfilled that the microscope image is to fulfil in order to comply with at least the textual input;
wherein a machine-learned image evaluation model is used to calculate whether the microscope image captured using the microscope settings ascertained by the large language model complies with the microscope image properties to be fulfilled that are derived from at least the textual input;
wherein, in cases where the microscope image complies with the microscope image properties to be fulfilled, the microscope image is used; and
wherein, in cases where the microscope image does not comply with the microscope image properties to be fulfilled, feedback is provided to the large language model, which uses the feedback to ascertain adjusted microscope settings for capturing a new microscope image.

20. The method according to claim 19,
wherein the first image is an overview image.

\* \* \* \* \*